United States Patent [19]

Marugame

[11] Patent Number: 5,757,674
[45] Date of Patent: May 26, 1998

[54] THREE-DIMENSIONAL POSITION DETECTING APPARATUS

[75] Inventor: Atsushi Marugame, Tokyo, Japan

[73] Assignee: NEC Corporation, Tokyo, Japan

[21] Appl. No.: 805,366

[22] Filed: Feb. 24, 1997

[30] Foreign Application Priority Data

Feb. 26, 1996 [JP] Japan ................................. 8-063755

[51] Int. Cl.$^6$ .......................... G02B 26/08; G06F 7/00; G06F 15/00
[52] U.S. Cl. .................... 364/559; 359/204; 359/209; 359/211; 395/825
[58] Field of Search ..................... 364/559; 345/419, 345/179, 6; 348/98, 94; 395/87, 89, 825; 340/706; 359/201–205, 212–219

[56] References Cited

U.S. PATENT DOCUMENTS

| | | |
|---|---|---|
| 5,669,013 | 9/1997 | Watanabe ................................. 395/825 |
| 5,694,235 | 12/1997 | Kajiki ........................................ 359/202 |

Primary Examiner—James P. Trammell
Assistant Examiner—Kamini S. Shah
Attorney, Agent, or Firm—Foley & Lardner

[57] ABSTRACT

In a three-dimensional position detecting apparatus, a perspective projection image sensing unit takes a perspective projection image of a target object having plural feature points $P_0$, $P_1$, ...., and an orthographic projection image sensing unit takes an orthographic projection image of the target object having the plural feature points. A two-dimensional coordinate acquiring unit acquires the two-dimensional coordinates of feature points in the perspective projection image, and the two-dimensional coordinates of feature points in the orthographic projection image. A camera parameter calculating unit calculates camera parameters with the two-dimensional coordinates of the feature points obtained by the two-dimensional coordinate acquiring unit. A three-dimensional coordinate calculating unit calculates the relative three-dimensional coordinate between the plural feature points with the two-dimensional coordinates of the feature points obtained by the two-dimensional coordinate acquiring unit and the camera parameters.

16 Claims, 14 Drawing Sheets

F I G. 2
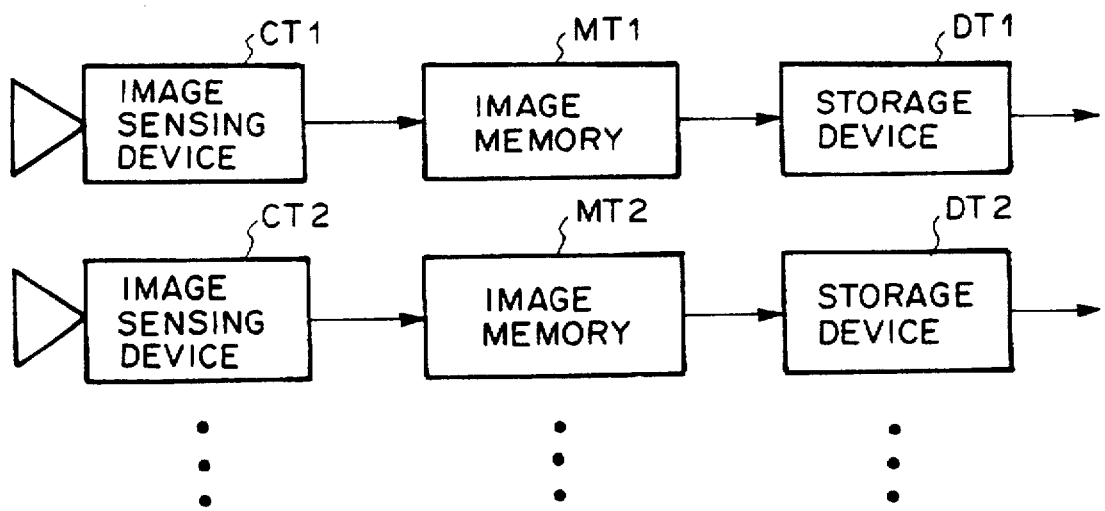
F I G. 4
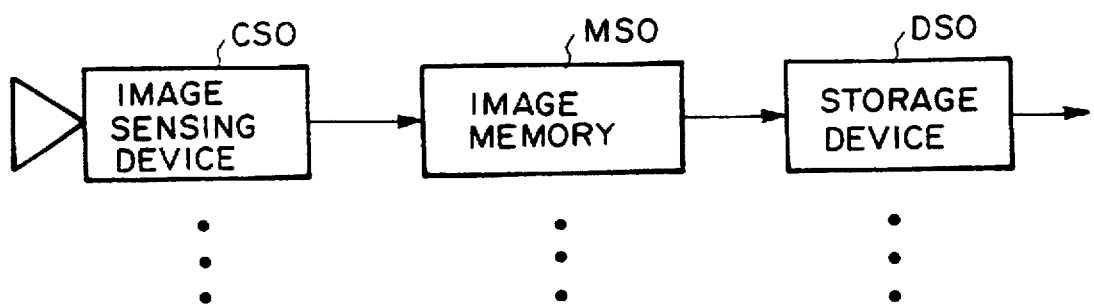

6: IMAGE DISPLAY DEVICE

11: MEASUREMENT SYSTEM

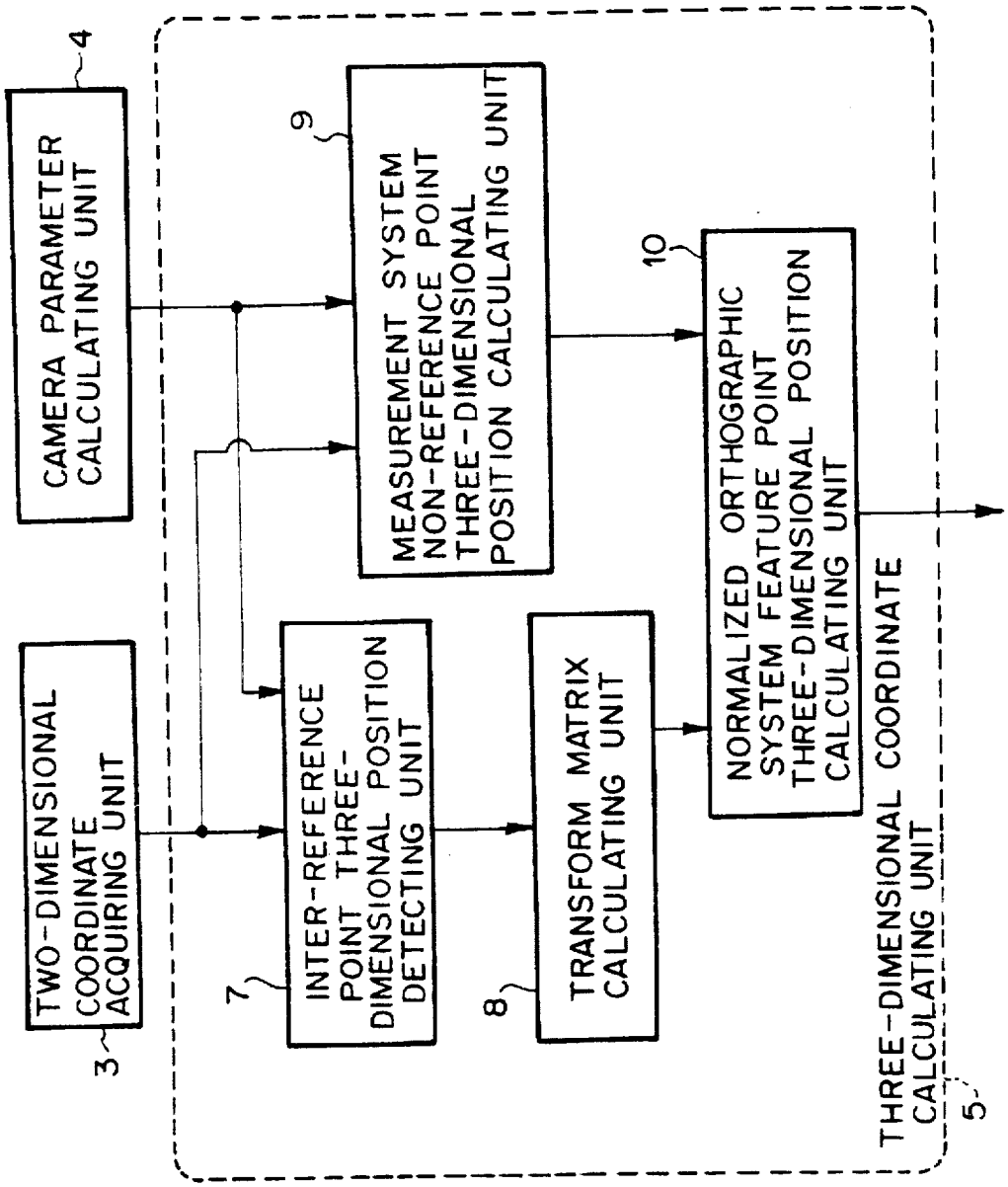

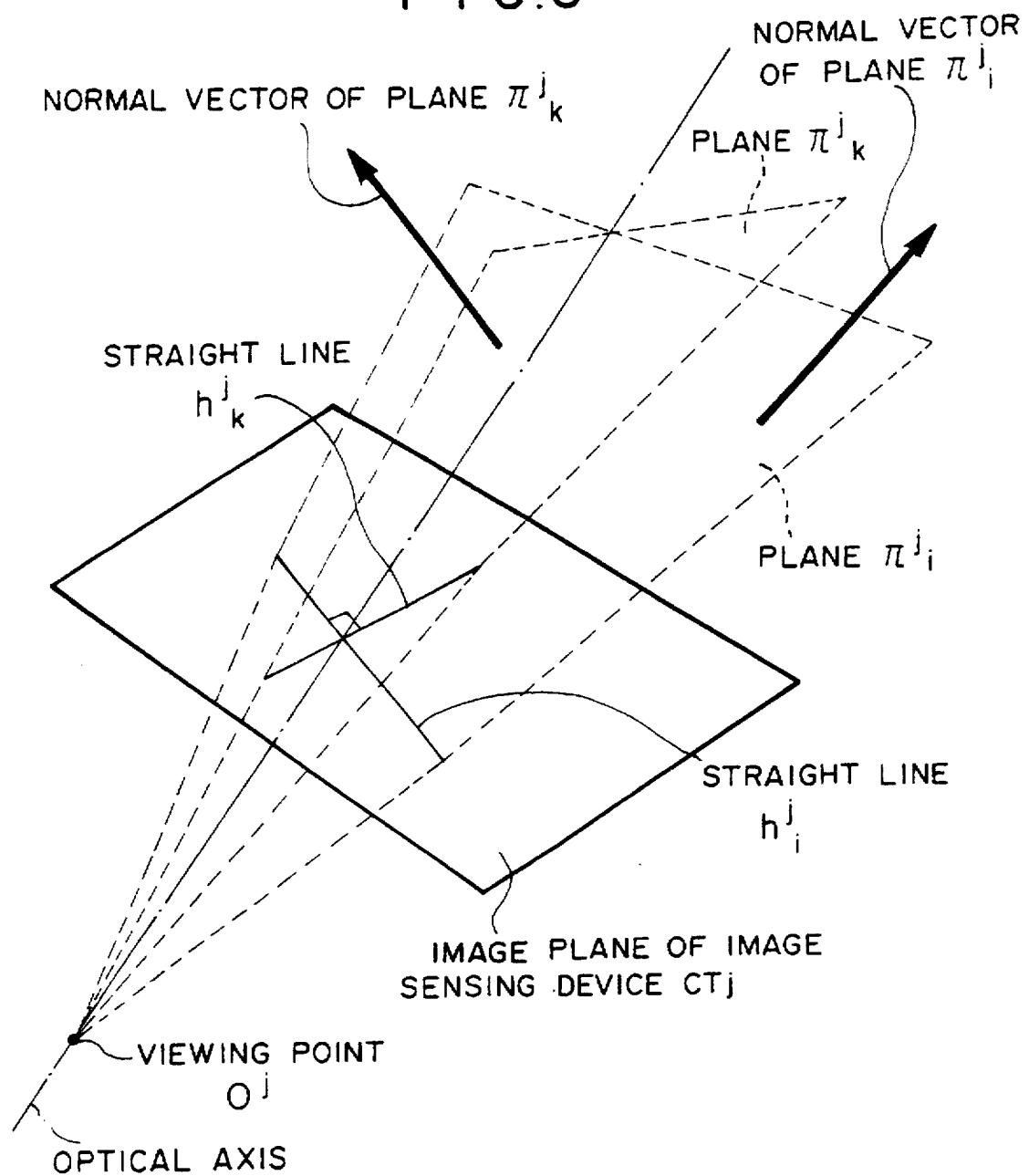

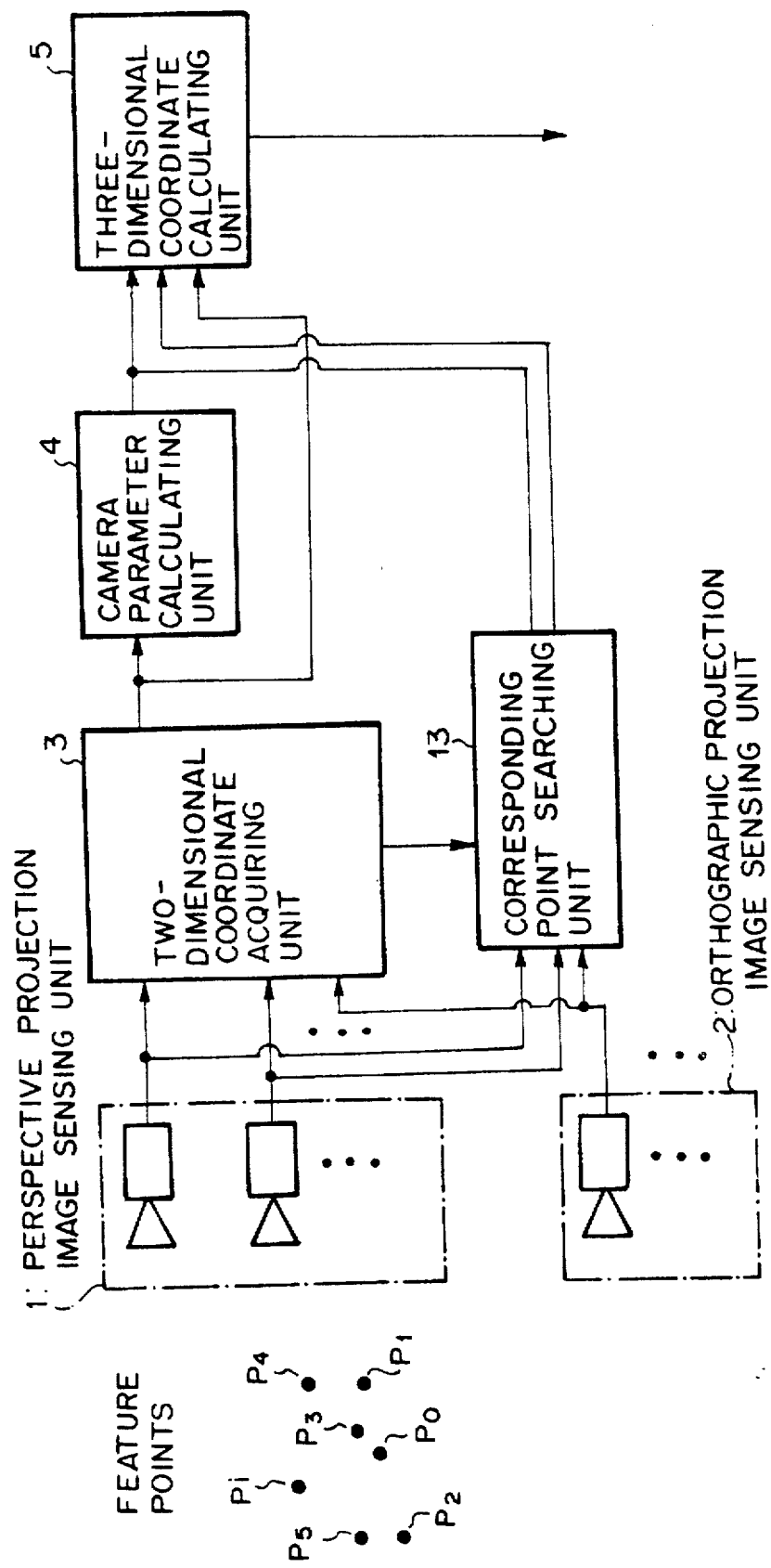

FIG.14
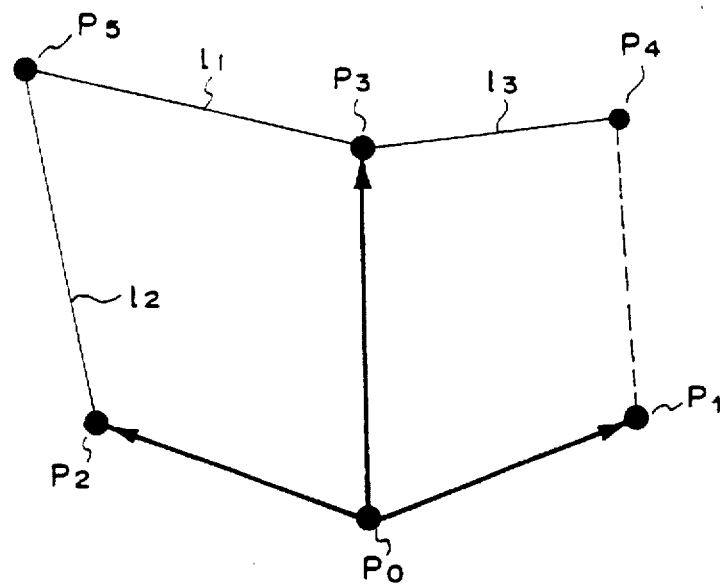
FIG.17
(PRIOR ART)
TARGET OBJECT
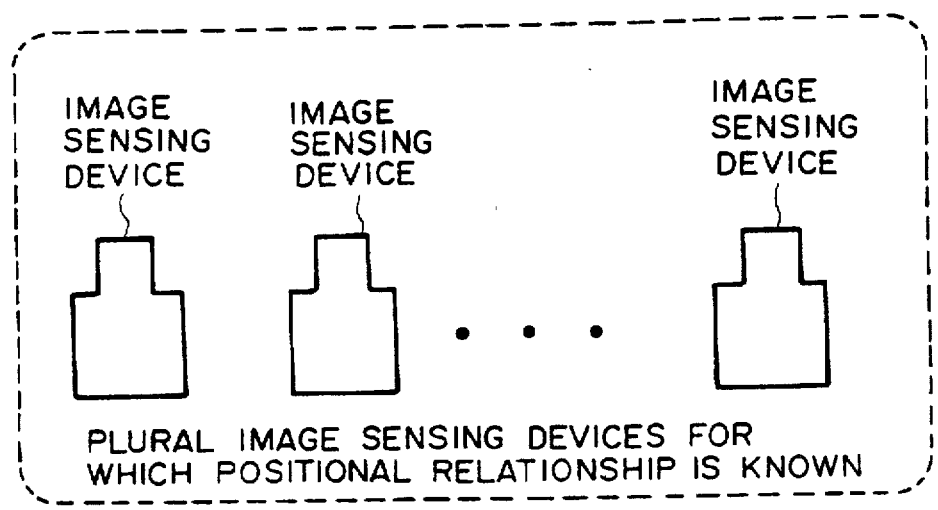
PLURAL IMAGE SENSING DEVICES FOR WHICH POSITIONAL RELATIONSHIP IS KNOWN

THREE-DIMENSIONAL POSITION DETECTING APPARATUS

BACKGROUND OF THE INVENTION

1. Field of the Invention

The present invention relates to a three-dimensional position detecting apparatus for a three-dimensional position detection and a three-dimensional recognition of a target object with images of the object.

2. Description of Related Art

As a conventional "system of three-dimensional position" have been known (1) a multilocular (multi-eye) system to which a photogrammetric technique is applied, (2) a system of irradiating slit light to a target object to detect reflected light from the target object, (3) a system of imaging a target object while varying the focal length of a camera to obtain plural images, (4) a system of recording information on a space where a target object exists, etc. These systems (1) to (4) will be described as follows.

(1) A "stereoscopic viewing apparatus" disclosed in Japanese Laid-open Patent Application No. Sho-62-162175 is known as a multilocular viewing system using the photogrammetric technique. In this system, a target object is imaged by plural image sensing devices for which the positional relationship is known as shown in FIG. 17, and the three-dimensional coordinate of the target object is estimated on the principle of triangulation by using two-dimensional projection points on images which are obtained in each image sensing device.

(2) A "stereoscopic viewing apparatus" in Japanese Laid-open Patent Application No. Sho-63-131007 is known as a system of irradiating the slit light to the target object to gather the reflected light. In this system, the three-dimensional coordinate of the target object is estimated on the principle of triangulation by using position information between a light source and a camera.

(3) A "stereoscopic viewing apparatus" in Japanese Laid-open Patent Application No. Hei-2-251708 is known as a system of using plural images obtained by imaging a target object while varying the focal length. In this system, plural images are picked up by a image sensing device whose focal length is variable such as a camera having a zoom lens to obtain corresponding points on the images, and the three-dimensional coordinate of the target object is estimated the corresponding points in differently focused images.

(4) A "three-dimensional coordinate position detecting method and apparatus" as disclosed in Japanese Laid-open Patent Application No. Hei-5-79819 is known as a system of recording information of a space where a target object exists. In this system, a corresponding table between the three-dimensional coordinate of the space where a target object exists and the two-dimensional coordinate on the image plane of plural image capturing devices, is prepared in advance, and the three-dimensional coordinate of the target object is estimated by using the corresponding table and the images taken by the plural image sensing devices.

The previous three-dimensional estimation systems (1) to (4) have the following problems (1) to (4), respectively.

(1) In the multilocular viewing system using the photogrammetric technique, the optical characteristics and the position information of the cameras are required, and thus it is necessary to measure the focal length of each camera in advance, the relative positions of the plural cameras, the intersectional angle of the optical axes of the plural cameras, etc. Accordingly, this system needs an very time-consuming work to precisely measure the optical characteristics of the cameras and the position of the optical axis of each camera. Further, in the case where cameras in a binocular system are disposed so that the optical axes of the cameras are parallel to each other like the "stereoscopic device" as disclosed in Japanese Laid-open Patent Application No. Sho-62-162175, there occurs a problem that the depth of a target object in a horizontal direction is not precisely measured.

(2) In the system of irradiating the slit light to a target object and gathering the reflected light, since it is necessary to irradiate the light to the target object in Japanese Laid-open Patent Application No. Sho-63-131007, a lighting condition must be limited. For example, an effect of external light is extremely affected even if an infrared-rays filter is used. Therefore, an application field of this system is limited.

(3) In the system of capturing differently focused images, for example, in Japanese Laid-open Patent Application No. Hei-2-251708, it needs such a cumbersome work as to record the focal length of every image. Further, since plural images must be taken by an image sensing device while varying the focal length, this system is very time-consuming.

(4) In the system of recording information of a space where a target object exists, for example, in Japanese Laid-open Patent Application No. He-5-7981, the optical characteristics of the light source and the camera and the position information of the camera are not needed, however, the three-dimensional coordinates of many points in a target for measurement must be estimated in advance, and thus unless an operator can enter the space, it is impossible to practically use this system.

SUMMARY OF THE INVENTION

An purpose of the present invention is to provide a three-dimensional position detecting apparatus which can three-dimensionally recognize a target object on the basis of only image data and calculate the relative three-dimensional position of the target object and an image sensing device with only image data without using the optical characteristics of a light source and a camera and the position information of the camera and without recording three-dimensional position information of a target space for measurement in advance, and especially to provide a three-dimensional position detecting apparatus which can perform fast three-dimensional recognition of such a target object containing two rectangles intersecting to each other in a space like an artificial object, and the calculation of the relative three-dimensional position of the target object and the image sensing device.

In order to attain the above purpose, a three-dimensional position detecting apparatus according to a first aspect of the present invention comprises: a perspective projection image sensing unit which has two or more image sensing devices and is adapted to take a perspective projection image of a target object having plural feature points by each image sensing device; an orthographic projection image sensing unit which has one or more image sensing devices and is adapted to take an orthographic projection image of the target object having the plural feature points by each image sensing device; a two-dimensional coordinate acquiring unit for acquiring the two-dimensional coordinates of the feature points in the perspective projection image which is picked up by the perspective projection image sensing unit, and the two-dimensional coordinates of the feature points in the orthographic projection image which is picked up by the orthographic projection image sensing unit; a camera parameter calculating unit for calculating camera parameters by using the two-dimensional coordinates of the feature points which are obtained by the two-dimensional coordinate acquiring unit; and a three-dimensional coordinate calculating unit for calculating the relative three-dimensional position between the plural feature points by using the two-dimensional coordinates of the feature points and the camera parameters calculated by the camera parameter calculating unit.

According to a second aspect of the present invention, a three-dimensional position detecting apparatus comprises: a perspective projection image sensing unit which has two or more image sensing devices and is adapted to take a perspective projection image of a target object having plural feature points by each image sensing device; an orthographic projection image sensing unit which has one or more image sensing devices and is adapted to take an orthographic projection image of the target object having the plural feature points by each image sensing device; a two-dimensional coordinate acquiring unit for acquiring the two-dimensional coordinates of feature points targeted to calculate camera parameters and in the perspective projection image taken by the perspective projection image sensing unit, and the two-dimensional coordinates of the feature points targeted to calculate the camera parameters in the orthographic projection image taken by the orthographic projection image sensing unit; a camera parameter calculating unit for calculating the camera parameters by using the two-dimensional coordinates of the feature points obtained targets to calculate the camera parameters by the two-dimensional coordinate acquiring unit; a corresponding point searching unit for establishing the corresponding relationship of feature points between the perspective projection image obtained by the perspective projection image sensing unit and the orthographic projection image obtained by the orthographic projection image sensing unit with the two-dimensional coordinates of the camera parameter calculation target feature points obtained by the two-dimensional coordinate acquiring unit and the camera parameters calculated by the camera parameter calculating unit, and calculating the two-dimensional coordinates of camera parameter calculation non-reference feature points in the perspective projection image obtained by the perspective projection image sensing unit and the two-dimensional coordinates of camera parameter calculation non-reference feature points in the orthographic projection image obtained by the orthographic projection image sensing unit; and a three-dimensional coordinate calculating unit for calculating the relative three-dimensional position between the plural feature points by using the two-dimensional coordinates of the camera parameter calculation reference feature points obtained by the two-dimensional coordinate acquiring unit, the camera parameters calculated by the camera parameter calculating unit, and the two-dimensional coordinates of the camera parameter calculation non-reference feature points obtained by the corresponding point searching unit.

According to a third aspect of the present invention, in the aforementioned three-dimensional position detecting apparatus, the image sensing device position of the relative three-dimensional positions of image sensing devices in the perspective projection image sensing unit are calculated by using the two-dimensional coordinates of the reference points obtained by the two-dimensional coordinate acquiring unit, the camera parameters calculated by the camera parameter calculating unit and the relative three-dimensional position between the feature points which is calculated by the three-dimensional coordinate calculating unit.

According to a fourth aspect of the present invention, in the aforementioned three-dimensional position detecting apparatus, when six feature points of the feature points are known to correspond to the apexes of two rectangles which intersect to each other in a space, the two-dimensional coordinate acquiring unit sets as reference points the feature points $P_0$ and $P_1$ which are both ends of a line segment to which the two rectangles intersect in the space, and sets as reference points the feature points $P_2$ and $P_3$ which are adjacent to the reference point $P_0$ in the two rectangles and other than the reference point $P_1$, and the camera calculating unit calculates the camera parameters by using the two-dimensional coordinates of the six feature points which correspond to the apexes of the two rectangles intersecting to each other in the space.

According to a fifth aspect of the present invention, in the aforementioned three-dimensional position detecting apparatus, the orthographic projection image sensing unit takes the orthographic projection image by using an image sensing device having a sufficiently long focal length.

According to a sixth aspect of the present invention, in the aforementioned three-dimensional position detecting apparatus, the orthographic projection image sensing unit takes the orthographic projection image by using an image sensing device which is disposed so that "the distance between the image sensing device and the target object" is sufficiently larger than "the distance between the feature points in the target object".

These and other purposes, characteristics and advantages of the present invention will become more apparent in light of the following detailed description of best mode embodiments thereof, as illustrated in the accompanying drawing.

BRIEF DESCRIPTION OF THE DRAWINGS

FIG. 2 is a diagram showing the construction of a perspective projection image sensing unit in FIG. 1;

FIG. 4 is a diagram showing the construction of an orthographic projection image sensing unit in FIG. 1;

FIG. 7 is a block diagram showing the construction of a three-dimensional coordinate calculating unit in FIG. 1;

FIG. 8 is a diagram showing the principle of calculating the three-dimensional position of a reference point by the three-dimensional coordinate calculating unit shown in FIG. 7;

FIG. 10 is a block diagram showing the construction of a second embodiment of the three-dimensional position detecting apparatus of the present invention;

FIG. 14 is a diagram showing two rectangles which intersect to each other in a space, which is used to explain the operation of a fourth embodiment of the three-dimensional position detecting apparatus of the present invention;

FIG. 17 is a diagram showing a multilocular viewing system which is a conventional system for performing three-dimensional position detection.

DETAILED DESCRIPTION OF THE PREFERRED EMBODIMENTS

Preferred embodiments according to the present invention will be described hereunder with reference to the accompanying drawings.

(1) FIRST EMBODIMENT (an embodiment of a first aspect of the present invention)

Figure 1:
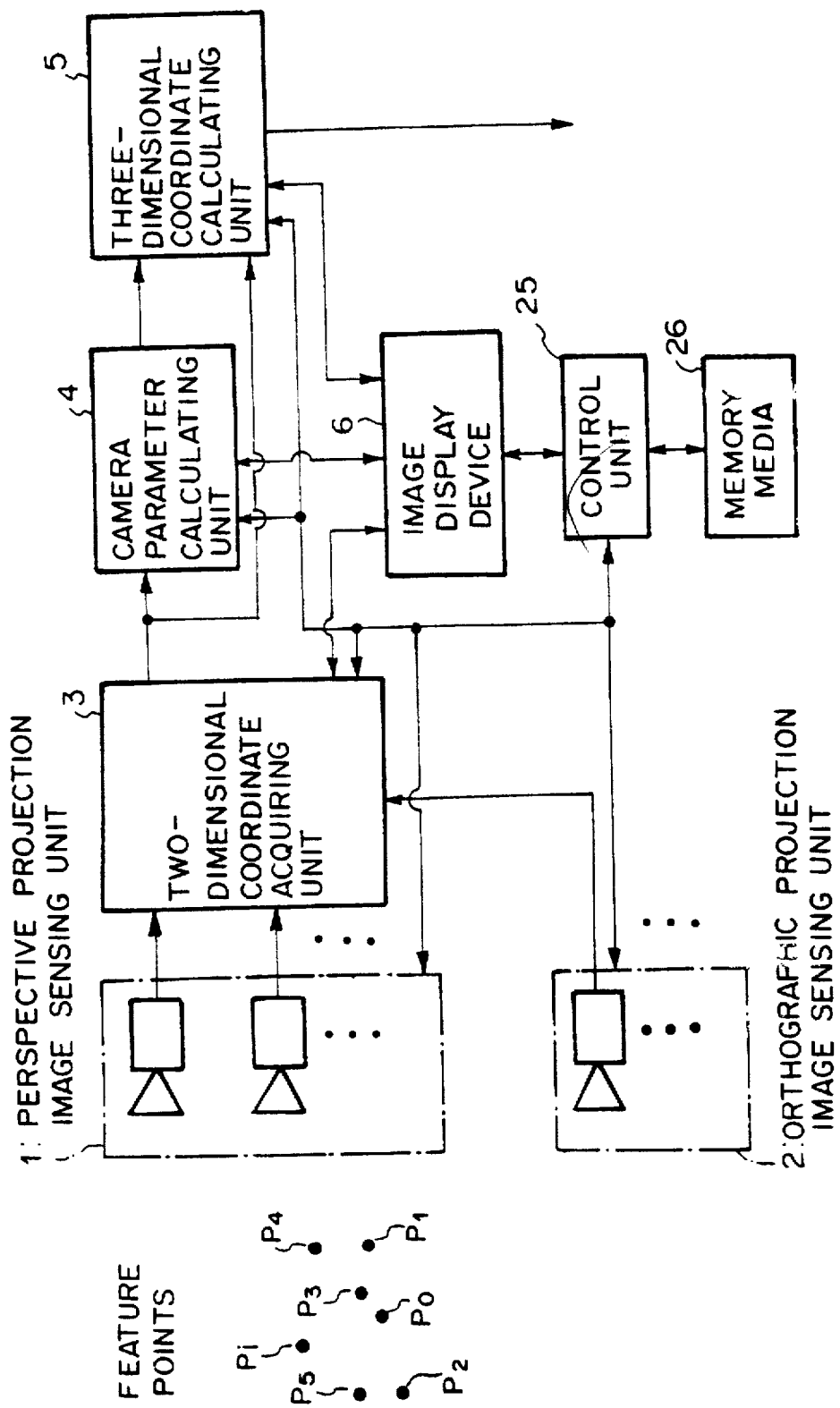
FIG. 1 is a block diagram showing the construction of a first embodiment of a three-dimensional position detecting apparatus according to the present invention.

FIG. 1 is a block diagram showing the construction of a first embodiment of a three-dimensional position detecting apparatus of the present invention.

The three-dimensional position detecting apparatus of this embodiment comprises a perspective projection image sensing unit 1, an orthographic projection image sensing unit 2, a two-dimensional coordinate acquiring unit 3, a camera parameter calculating unit 4, and a three-dimensional coordinate calculating unit 5. Further, the three-dimensional position detecting apparatus may contain an image display device 6, a control unit 25 having CPU and peripheral unit and for controlling each units thereof, and a memory media for controlling the CPU, for storing data from the CPU, and for delivering for other system.

First, the operation of the three-dimensional position detecting apparatus of the first embodiment will be described.

The perspective projection image sensing unit 1 is adapted to take a perspective projection image of a target object having plural feature points Pi (i=0, 1, . . . ). The perspective projection image which is taken by the perspective projection image sensing unit 1 is output to the two-dimensional coordinate acquiring unit 3.

The orthographic projection image sensing unit 2 is adapted to take an orthographic projection image of a target object having plural features Pi (i=0, 1, . . . ). The orthographic projection image which is taken by the orthographic projection image sensing unit 2 is output to the two-dimensional coordinate acquiring unit 3. Incidentally, the feature point may be set by each of the following two methods. As a first method, the orthographic projection image from the orthographic projection image sensing unit 2 is output to the image display device 6, and then some points on the image display device 6 are specified as feature points by an instruction of an user. Alternatively, as a second method, the orthographic projection image signal is differentiated and then plural peaks of the differential result are selected as feature points.

The two-dimensional coordinate acquiring unit 3 inputs each image of the target object (each perspective projection image and each orthographic projection image) from the perspective projection image sensing unit 1 and the orthographic projection image sensing unit 2 to acquire the two-dimensional coordinate of each feature point in each image, and then outputs the two-dimensional coordinates thus obtained to the camera parameter calculator 4 and the three-dimensional coordinate calculating unit 5. In this specification, "the two-dimensional coordinates of the feature points in the image" mean "the two-dimensional coordinates of the projection points of the feature points in the image concerned" more accurately.

The camera parameter calculating unit 4 receives the two-dimensional coordinates to calculate the camera parameters with the two-dimensional coordinates of some feature points, and then outputs the camera parameters thus calculated to the three-dimensional coordinate calculating unit 5. Here, the camera parameters are defined as line, the rotational angle of each camera and the position of each camera.

The three-dimensional coordinate calculating unit 5 receives the two-dimensional coordinates of the feature points Pi (i=0,1, . . . ) in each image and the camera parameters in order to calculate the relative three-dimensional position relationship among the plural feature points by using the two-dimensional coordinates and the camera parameters thus received, and then outputs the three-dimensional position to the outside.

Next, the construction and the detailed operation of each part in FIG. 1 will be described.

As shown in FIG. 2, the perspective projection image sensing unit 1 comprises plural image sensing devices CT1, CT2, . . . , plural image memories MT1, MT2, . . . , and plural storage devices DT1, DT2, . . . . In this case, the number of the image memories and the storage devices is equal to the number of the image sensing devices, respectively. The function of "the combination of the image sensing devices, the image memories and the storage devices" as described above are the same as the prior art, and thus the description of the image memories and the storage devices is omitted from the following description. Further, the same omission is applied to the orthographic projection image sensing device 2 as described later.

Figure 3:
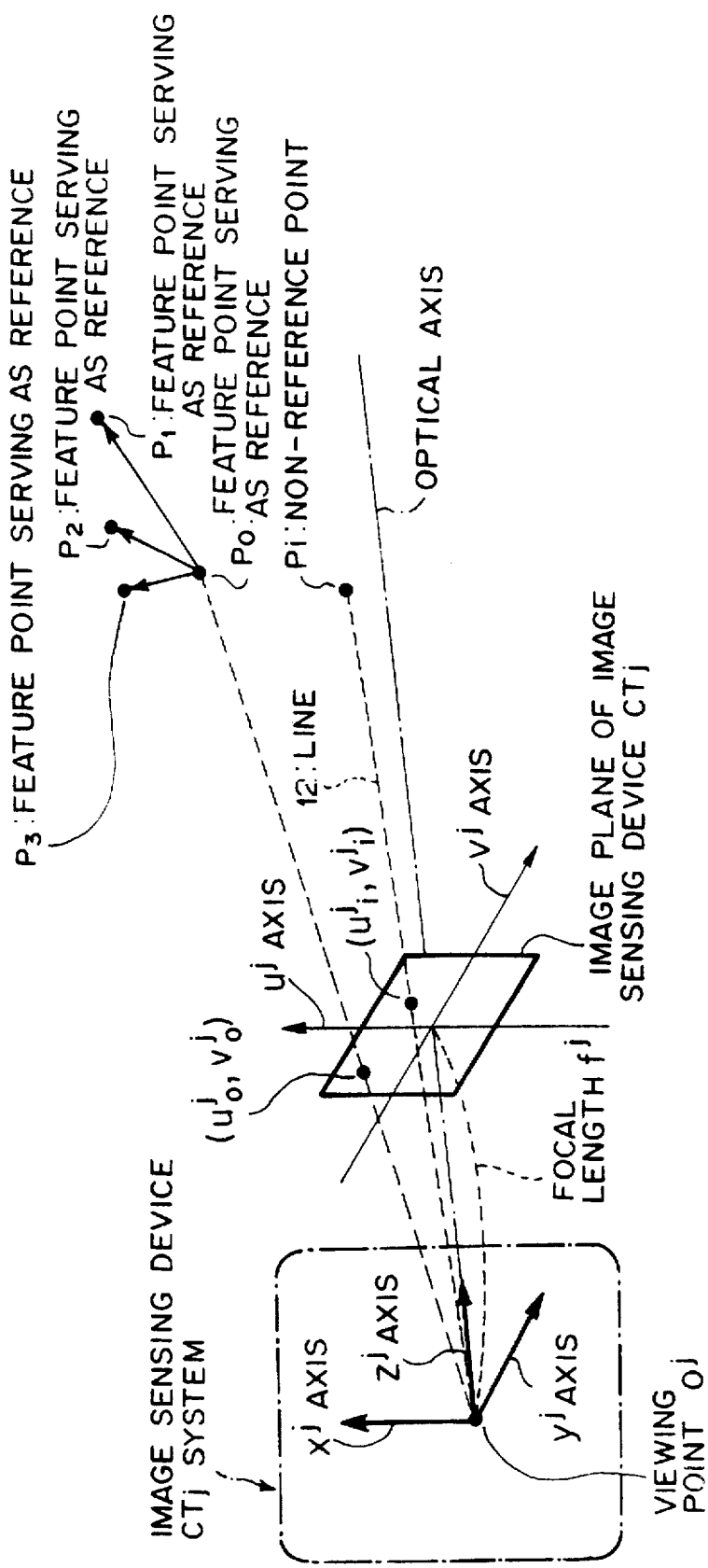
FIG. 3 is a diagram showing the principle of an image sensing device of the perspective projection image sensing unit in FIG. 2.

Each image sensing device CT1, CT2, . . . may be modeled by a pinhole camera model as shown in FIG. 3.

The perspective projection images which are taken by the image sensing devices CT1, CT2, . . . are named as images IT1, IT2, . . . respectively, and output to the two-dimensional coordinate acquiring unit 3.

Figure 5:
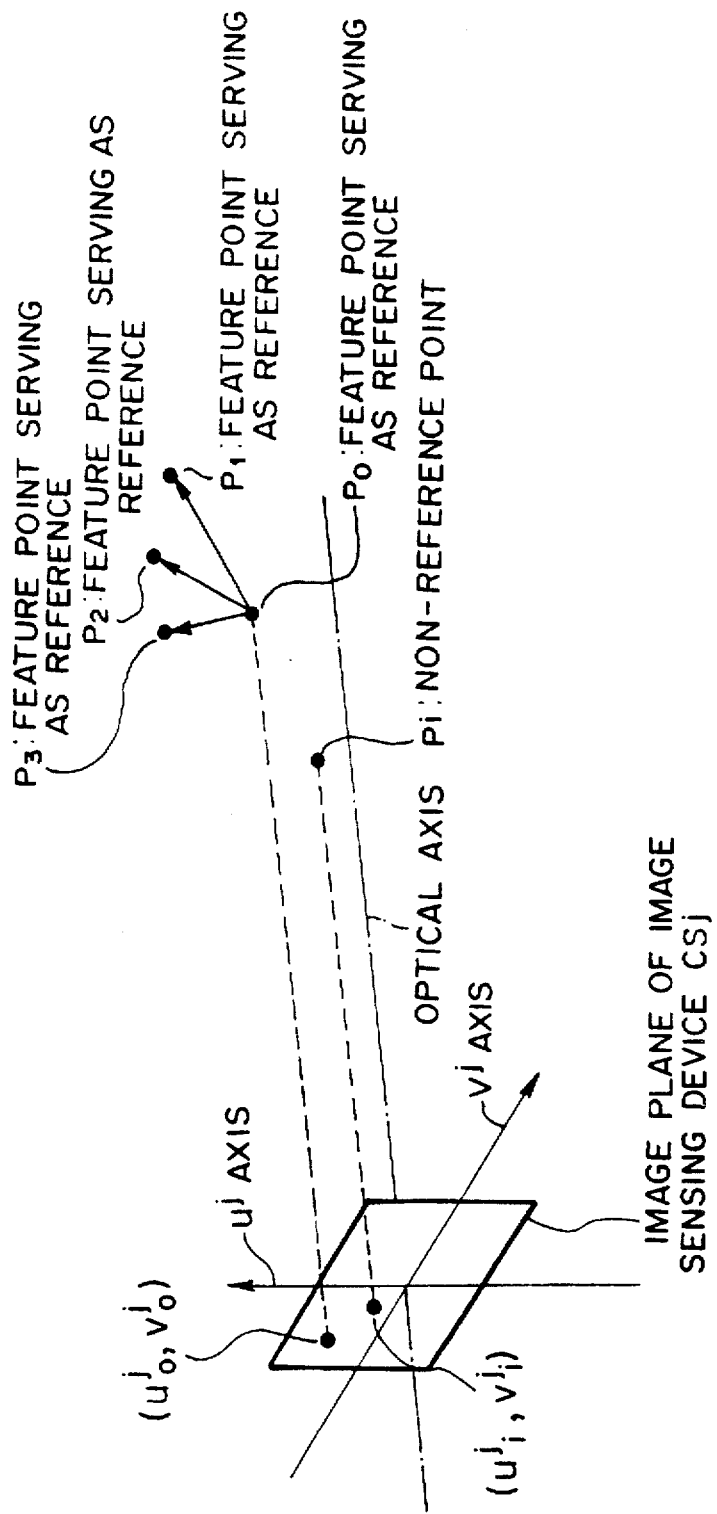
FIG. 5 is a diagram showing the principle of an image sensing device of the orthographic projection image sensing unit in FIG. 4.

As shown in FIG. 4, the orthographic projection image sensing unit 2 comprises one or more image sensing devices CS0, . . . , image memories MS0, . . . (the number of the image memories is equal to the number of the image sensing devices), and storage devices DS0, . . . . In this case, the number of the image memories and the storage devices is equal to the number of the image sensing devices, respectively. Further, the number of the image sensing devices may be one. Each image sensing device CS0 may be modeled by a model as shown in FIG. 5.

The orthographic projection images which are taken by the respective image sensing devices CS0, . . . are named as images IS0, . . . , and output to the two-dimensional coordinate acquiring unit 3.

In this embodiment, it is unnecessary to beforehand clarify the optical characteristic of each image sensing device of the perspective projection image sensing unit 1 and the orthographic projection image sensing unit 2 and the relative positional among the image sensing devices. Further, each of the image memories MT1, MT2, . . . and MS0, ... is designed to store image data every frame or field, and each of the storage devices DT1, DT2, ..., and DS0, ... comprises a recording medium such as HD, FD, DAD or the like which is cable of storing image signals transmitted from each of the image memories MT1, MT2, ... and MS0, ... every plural frames or fields.

Figure 6:
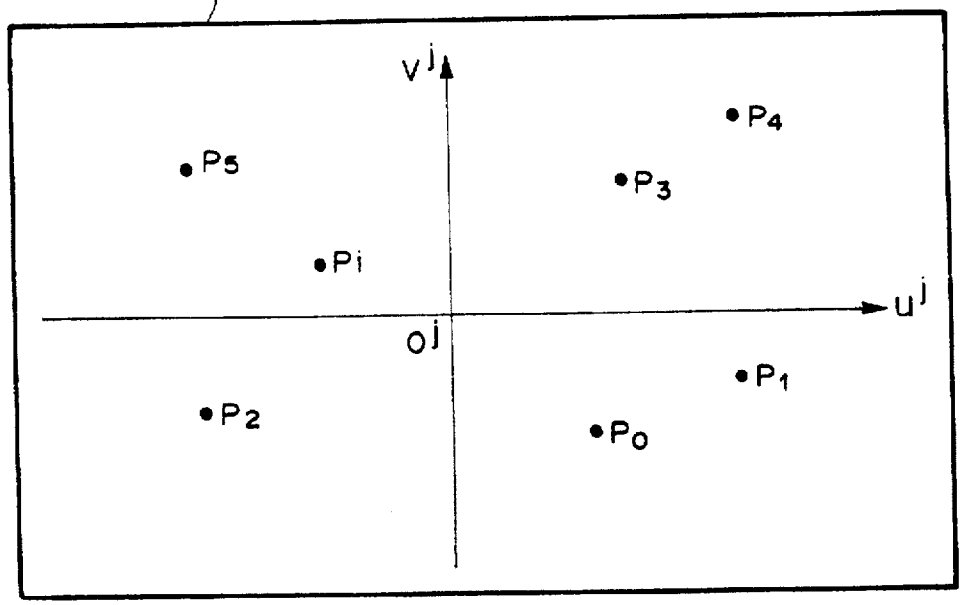
FIG. 6 is a diagram showing a displaying example on an image display device.

The two-dimensional coordinate acquiring unit 3 acquires the two-dimensional coordinate of each feature point Pi in each image on the basis of the plural perspective projection images (images IT1, IT2, ...) received from the perspective projection image sensing unit 1 and one or more orthographic projection images (images IS0, ...) received from the orthographic projection image sensing unit 2, and outputs the two-dimensional coordinate to the camera parameter calculating unit 4. The output operation of the two-dimensional coordinate from the two-dimensional coordinate acquiring unit 3 is successively carried out on each feature point until the camera parameters are calculated in the camera parameter calculating unit 4. In this case, the camera parameter calculating unit 4 does not necessarily use the two-dimensional coordinates of all the feature points to calculate the camera parameters. The aforementioned output operation as described above may be performed based on an operator's instruction which is made by an operator while seeing a display frame (see FIG. 6) on the image display device 6, or by automatic detection using a pattern recognition technique. During the output operation, four feature points Pk (k=0, 1, 2 and 3) are selected so that they are not located on the same plane in the space (see FIG. 8 for "plane" in the space). These four feature points are referred to as "reference points" or "reference feature points".

The camera parameter calculating unit 4 receives the two-dimensional coordinates of the feature points Pi in each image from the two-dimensional coordinate acquiring unit 3, and calculates the camera parameters as follows.

That is, according to the following equations (1) to (6), the camera parameter calculating unit 4 calculates coefficients $w^i_1, \ldots, w^i_6$ from the two-dimensional coordinates $(u^0_k, v^0_k)$ of reference points Pk (k=0,0,1,2 and 3) in the image IS0, the two-dimensional coordinates $(u^j_k, v^j_k)$ of reference points Pk (k=0,1,2 and 3) in the image ITj (j=1, ...), the two-dimensional coordinates $(u^0_i, v^0_i)$ of feature points Pi (i=4, ...) in the image IS0, and the two-dimensional coordinates $(u^j_i, v^j_i)$ of feature points Pi (i=4, ...) in the image ITj.

$$W_1^i = \{(v_3^0 - v_0^0)u_i^0 + (u_0^0 - u_3^0)v_i^0 +$$
$$u_3^0 v_0^0 - u_0^0 v_3^0\}\{(v_l^j - v_d^j)u_l^j + (u_d^j - u_l^j)v_l^j + u_l^j v_d^j - u_d^j v_l^j\} \quad (1)$$

$$W_2^i = \{(v_2^0 - v_0^0)u_i^0 + (u_0^0 - u_2^0)v_i^0 +$$
$$u_2^0 v_0^0 - u_0^0 v_2^0\}\{(v_l^j - v_l^j)u_l^j + (u_l^j - u_l^j)v_l^j + u_l^j v_l^j - u_l^j v_l^j\} \quad (2)$$

$$W_3^i = \{(v_l^0 - v_0^0)u_i^0 + (u_0^0 - u_l^0)v_i^0 +$$
$$u_l^0 v_0^0 - u_0^0 v_l^0\}\{(v_l^j - v_l^j)u_l^j + (u_l^j - u_l^j)v_l^j + u_l^j v_l^j - u_l^j v_l^j\} \quad (3)$$

$$W_4^i = \{(v_2^0 - v_3^0)u_i^0 + (u_3^0 - u_2^0)v_i^0 +$$
$$u_2^0 v_3^0 - u_3^0 v_2^0\}\{(v_l^j - v_d^j)u_l^j + (u_d^j - u_l^j)v_l^j + u_l^j v_d^j - u_d^j v_l^j\} \quad (4)$$

$$W_5^i = \{(v_3^0 - v_l^0)u_i^0 + (u_l^0 - u_3^0)v_i^0 +$$
$$u_3^0 v_l^0 - u_l^0 v_3^0\}\{(v_l^j - v_d^j)u_l^j + (u_d^j - u_l^j)v_l^j + u_l^j v_d^j - u_d^j v_l^j\} \quad (5)$$

$$W_6^i = \{(v_l^0 - v_2^0)u_i^0 + (u_2^0 - u_l^0)v_i^0 +$$
$$u_l^0 v_2^0 - u_2^0 v_l^0\}\{(v_l^j - v_d^j)u_l^j + (u_d^j - u_l^j)v_l^j + u_l^j v_d^j - u_d^j v_l^j\} \quad (6)$$

Further, the camera parameters $c^j_1, c^j_2$ and $c^j_3$ are output by using three or more equations (i=4, 5, 6, ...) represented by the following equation (7) for each j (j=1, ...):

$$w^i_1 c^j_1 c^j_2 + w^i_2 c^j_1 c^j_3 + w^i_3 c^j_2 c^j_3 + w^i_4 c^j_1 + w^i_5 c^j_2 + w^i_6 c^j_3 = 0 \quad (7)$$

The equations (1) to (6) never contains the information on the position condition of the camera (image sensing device), the relative position of the feature points, etc. That is, the equations (1) to (6) never contains the information which is needed for the conventional three-dimensional position detecting system).

The information on the position and attitude of the image sensing device CTj can be obtained by using the camera parameters $c^j_1, c^j_2$ and $c^j_3$ calculated in the camera parameter calculating unit 4 and the two-dimensional coordinates $(u^j_k, v^j_k)$(k=0,1,2,3) of the reference points in each image ITj (j=1, ...) in combination.

The three-dimensional coordinate calculating unit 5 is supplied with the two-dimensional coordinates of the feature points output from the two-dimensional coordinate acquiring unit 3 and the camera parameters are output from the camera parameter calculating unit 4.

As shown in FIG. 7, the three-dimensional coordinate calculating unit 5 comprises an inter-reference three-dimensional position calculating unit 7 for calculating the relative three-dimensional position between reference points in a measurement system, a transforming matrix calculating unit 8 for calculating a transforming matrix from the measuring system to a normalized orthographic system, a measurement system non-reference point three-dimensional position calculating unit 9 for calculating the three-dimensional position of a non-reference point (the definition of the non-reference point will be described later) in the measurement system, and a normalized orthographic system feature point three-dimensional position calculating unit 10 for calculating the three-dimensional position of the feature points in the normalized orthographic system.

The three-dimensional coordinate calculating unit 5 constructed as described above outputs the three-dimensional positional relationship between the feature points in the normalized orthographic system which is usually used through the following operations (1) to (4) of the respective parts of the three-dimensional coordinate calculating unit 5.

(1) The inter-reference point position calculating unit 7 operates as follows.

As shown in FIG. 8, a line which intersects to the optical axis of an image sensing device CTj (j=1, ...) on an image plane is represented by $h^j_i$, and a line which is perpendicular to the line $h^j_i$ on the image plane and the optical axis is represented by $h^j_k$. Further, a plane containing the line $h^j_i$ and the viewing point $O^j$ of the image sensing device CTj is represented by $\pi^j_i$, and a plane containing the line $h^j_k$ and the viewing point $O^j$ of the image sensing device CTj is represented by $\pi^j_k$.

Figure 9:
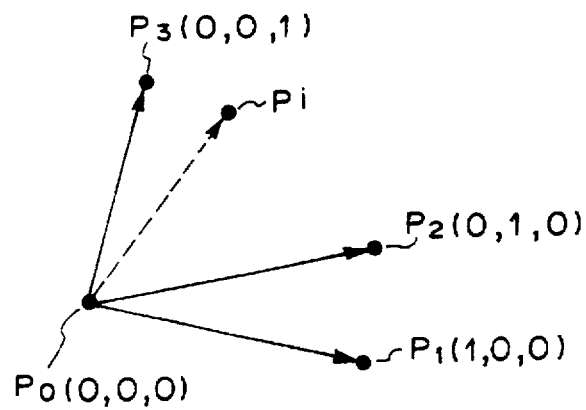
FIG. 9 is a diagram showing a detection system used to explain the operation of the three-dimensional coordinate calculating unit shown in FIG. 7.

Note that, S represents a transformation from a normalized orthographic system Λ to a measurement system 11 which is constructed by reference points $P_k$ (k=0, 1, 2 and 3) as shown in FIG. 9. In the measurement system 11, $P_0$ represents the origin of the measurement system 11, $P_1$ represents a coordinate point (1,0,0), $P_2$ represents a coordinate point (0,1,0) and $P_3$ represents a coordinate point (0,0,1).

As shown in FIG. 8, if the line $h^j_i$ and the line $h^j_k$ are perpendicular to each other in an image on the image plane, the plane $\pi^j_i$ and the plane $\pi^j_k$ are perpendicular to each other in the normalized orthographic system Λ.

By using basic vectors $q_1, q_2$ and $q_3$ of the measurement system 11 which is viewed from the normalized orthographic system Λ, the matrix expression of S (this is also represented by S. S represents a transform matrix from the normalized orthographic system Λ to the measurement system 11) can be represented as follows:

$S = (q_1, q_2, q_3)$

Note that, considering the following equation:

$$S^t S = \begin{vmatrix} q_1^t \\ q_2^t \\ q_3^t \end{vmatrix} |q_1 q_2 q_3| = \begin{vmatrix} (q_1, q_1) & (q_1, q_2) & (q_1, q_3) \\ (q_1, q_2) & (q_2, q_2) & (q_2, q_3) \\ (q_1, q_3) & (q_2, q_3) & (q_3, q_3) \end{vmatrix} \quad (9)$$

Note that, the $S^t$ is a transposition matrix of S. $S^t S$ contains the inner product of the basic vectors $q_1$, $q_2$ and $q_3$ as an element. Therefore, if $S^t S$ is calculated, the three-dimensional relative position between the reference points in the measurement system II can be determined.

Normal vectors of the plane $\pi^j_i$ and the plane $\pi^j_k$ in the measurement system 11 which are represented by the camera parameters are now represented by $d^j_i$ and $d^j_k$. At this time, the normal vectors of the plane $\pi^j_i$ and the plane $\pi^j_k$ in the normalized orthographic system Λ are represented by $d^j_i S^{-1}$ and $d^j_k S^{-1}$ ($S^{-1}$ represents the inverse matrix of S) respectively. Accordingly, the following equation (10) is obtained on the basis of the orthographic relationship between the plane $\pi^j_i$ and the plane $\pi^j_k$:

$$d^j_i (S^t S)^{-1} (d^j_k)^t = 0 \quad (10)$$

The same equation is obtained for the image sensing device CSj (j=0, ...).

The three-dimensional position of the inter-reference point calculating unit 7 obtains the aforementioned orthographic relationship by using three or more images of the images ITj (j=1, ...) and the images ISj(j=0, ...) and then the relative three-dimensional relative position between the reference points $P_k$ (k=0,1,2 and 3) are calculated.

(2) The transform matrix calculating unit 8 operates as follows.

In order to calculate a transform matrix from the measurement system to the normalized orthographic system, the transform matrix calculating unit 8 calculates a transform matrix T from the measurement system 11 to an appropriate normalized orthographic system Σ according to a Schmidt's orthonormalization method or the like by using "the relative three-dimensional relative positions between the reference points $P_k$ (k=0,1,2 and 3)" calculated by the inter-reference point three-dimensional position calculating unit 7.

(3) The three-dimensional position calculating unit 9 for the non-reference points in the measurement system operates as follows.

The measurement-system non-reference three-dimensional calculating unit 9 calculates the coordinates (three-dimensional position) in the measurement system 11 of the feature points $P_i$ (i=4, . . . . These features are hereinafter referred to as "non-reference points") other than the reference points $P_k$ (k=0,1,2 and 3).

The equations representing a line (see a line 12 in FIG. 3) which connects the viewing point $O^j$ in the image sensing device CTj (j=1, ...) onto the perspective projection image sensing unit 1 and the non-reference point $P_i$ are obtained for each image sensing device CTj.

$$\{c_i^j(u^j - u_i^j) + (u_0^j - u^j)\alpha + \{c_2^j(u^j - u_2^j) + (u_0^j - u^j)\}\beta + \quad (11)$$

$$\{c_3^j(u^j - u_3^j) + (u_0^j - u^j)\}\gamma = u_0^j - u^j$$

$$\{c_1^j(v^j - v_1^j) + (v_0^j - v^j)\alpha + \{c_2^j(v^j - v_2^j) + (v_0^j - v^j)\}\beta + \quad (12)$$

$$\{c_3^j(v^j - v_3^j) + (v_0^j - v^j)\}\gamma = v_0^j - v^j$$

The three-dimensional coordinate of the non-reference point $P_i$ in the measurement system 11 is calculated by using the equations (11) and (12). This calculation corresponds to an estimation of the coordinate by using the triangulation principle with two or more cameras which have been subjected to camera calibration.

(4) The three dimensional position calculating unit 10 for the feature points in the normalized orthographic system operates as follows.

The normalized orthographic system feature point three-dimensional position calculating unit 10 transforms the three-dimensional coordinates of the feature points in the measurement system 11 to the normalized orthographic system Σ by the transform matrix T based on "the transform matrix T from the measurement system 11 to the normalized orthographic system Σ" and the "three-dimensional coordinates of the feature points in the measurement system 11" which are obtained in the foregoing (1) to (3), and thereby calculates the three-dimensional position of the non-reference points in the normalized orthographic system Σ.

The three-dimensional coordinate calculating unit 5 (specifically, the normalized orthographic system feature point three-dimensional position calculating unit 10) finally outputs the three-dimensional position of the feature point in the normalized orthographic system Σ.

Therefore, the three-dimensional coordinate calculating unit 5 receives the two-dimensional coordinates of the feature points Pi (i=0,1, ...) of each image which are transmitted from the two-dimensional coordinate acquiring unit 3 and the camera parameters calculated by the camera parameter calculating unit 4, and on the basis of these values, the three-dimensional coordinate calculating unit 5 calculates the relative three-dimensional coordinate position between the plural feature points concerned, and then outputs the three-dimensional position to the outside.

Further, in above operation of the three-dimensional position detecting apparatus, the memory media 26 is stored a program software for controlling each units of the apparatus by the control unit 25. For example, the control unit 25 controls the camera parameter calculating unit 4 for calculating the equations (1) to (6) according to the software program on the memory media 26. Further, the memory media may be stored data of the acquired and calculated results from the two-dimensional coordinate acquiring unit, the camera parameter calculating unit and so like. Incidentally, a driver for reading and writing the software program to the memory media is not showed in FIG. 1.

(2) SECOND EMBODIMENT

FIG. 10 is a block diagram showing the construction of a second embodiment according to the three-dimensional position detecting apparatus of the present invention.

The three-dimensional position detecting apparatus of this embodiment includes a perspective projection image sensing unit 1, an orthographic projection image sensing unit 2, a two-dimensional coordinate acquiring unit 3, a camera parameter calculating unit 4, a three-dimensional coordinate calculating unit 5, and a corresponding point searching unit 13. That is, the three-dimensional position detecting apparatus of this embodiment is achieved by adding a corresponding point searching unit 13 to the three-dimensional position detecting apparatus of the first embodiment (see FIG. 1).

Incidentally, as same as described by the first embodiment, the three-dimensional position detecting apparatus may contain the image display device 6, control unit 25, and memory media.

The perspective projection image sensing device 1 takes a perspective projection image of a target object having plural feature points Pi (i=0, 1). The perspective projection image which is taken by the perspective projection image sensing device 1 is output to the two-dimensional coordinate acquiring unit 3 and the corresponding point searching unit 13.

The orthographic projection image sensing unit 2 takes an orthographic projection image of a target object having plural feature points Pi (i=0,1 . . . ). The orthographic projection image which is taken by the orthographic projection image sensing unit 2 is output to the two-dimensional coordinate acquiring unit 3 and the corresponding point searching unit 13.

The two-dimensional coordinate acquiring unit 3 receives each image of the target object (each perspective projection image and each orthographic projection image) from the perspective projection image sensing unit 1 and the orthographic projection image sensing unit 2 to acquire the two-dimensional coordinates of feature points Pi (i=0, . . . , n (n represents an integer)) until the camera parameters are calculated by the camera parameter calculating unit 4, and sends the two-dimensional coordinates to the camera parameter calculating unit 4, the three-dimensional coordinate calculating unit 5 and the corresponding point searching unit 13. Note that, "the feature points of n+1 whose two-dimensional coordinates are used until the camera parameters are calculated by the camera parameter calculating unit 4" are referred to as "calibration feature points".

The camera parameter calculating unit 4 receives the two-dimensional coordinates to calculate the camera parameters with the two-dimensional coordinates of calibration feature points, and sends the camera parameters to the three-dimensional coordinate calculating unit 5 and the corresponding point searching unit 13.

After the camera parameters are calculated, the corresponding point searching unit 13 receives the two-dimensional coordinates of calibration feature points Pi (i=0, . . . , n) in each image from the two-dimensional coordinate acquiring unit 3, and also receives the camera parameters from the camera parameter calculating unit 4. In addition to this operation, in place of the two-dimensional coordinate acquiring unit 3, the corresponding point searching unit 13 calculates the two-dimensional coordinates of the feature points Pi (i=n+1, . . . ) in each image based on the corresponding processing between the images of the feature points Pi (i=n+1, . . . ) (each perspective projection image of the target object is received from the perspective projection image sensing unit 1 and each orthographic projection image of the target object is received from the orthographic projection image pick unit 2), and sends the two-dimensional coordinates to the tree-dimensional coordinate calculating unit 5. Note that, "the feature points Pi (i=n+1, . . . ) which are not used for the calculation of the camera parameters" are referred to as "non-calibration feature points".

The three-dimensional coordinate calculating unit 5 receives the two-dimensional coordinates of the feature points Pi (i=0,1, . . . ) as all feature points of each image which are transmitted from the two-dimensional coordinate acquiring unit 3 and the corresponding point searching unit 13, and the camera parameters calculated by the camera parameter calculating unit 4, and based on these values, the three-dimensional coordinate calculating unit 5 calculates the relative three-dimensional coordinate position between the plural feature points, and then outputs the three-dimensional position to the outside.

Next, the detailed construction and operation of the corresponding to the corresponding point searching unit 13 shown in FIG. 10 will be described.

The corresponding point searching unit 13 performs the corresponding processing between the feature points of the image (non-calibration) which are not used for the calculation of the camera parameter as follows.

Figure 11:
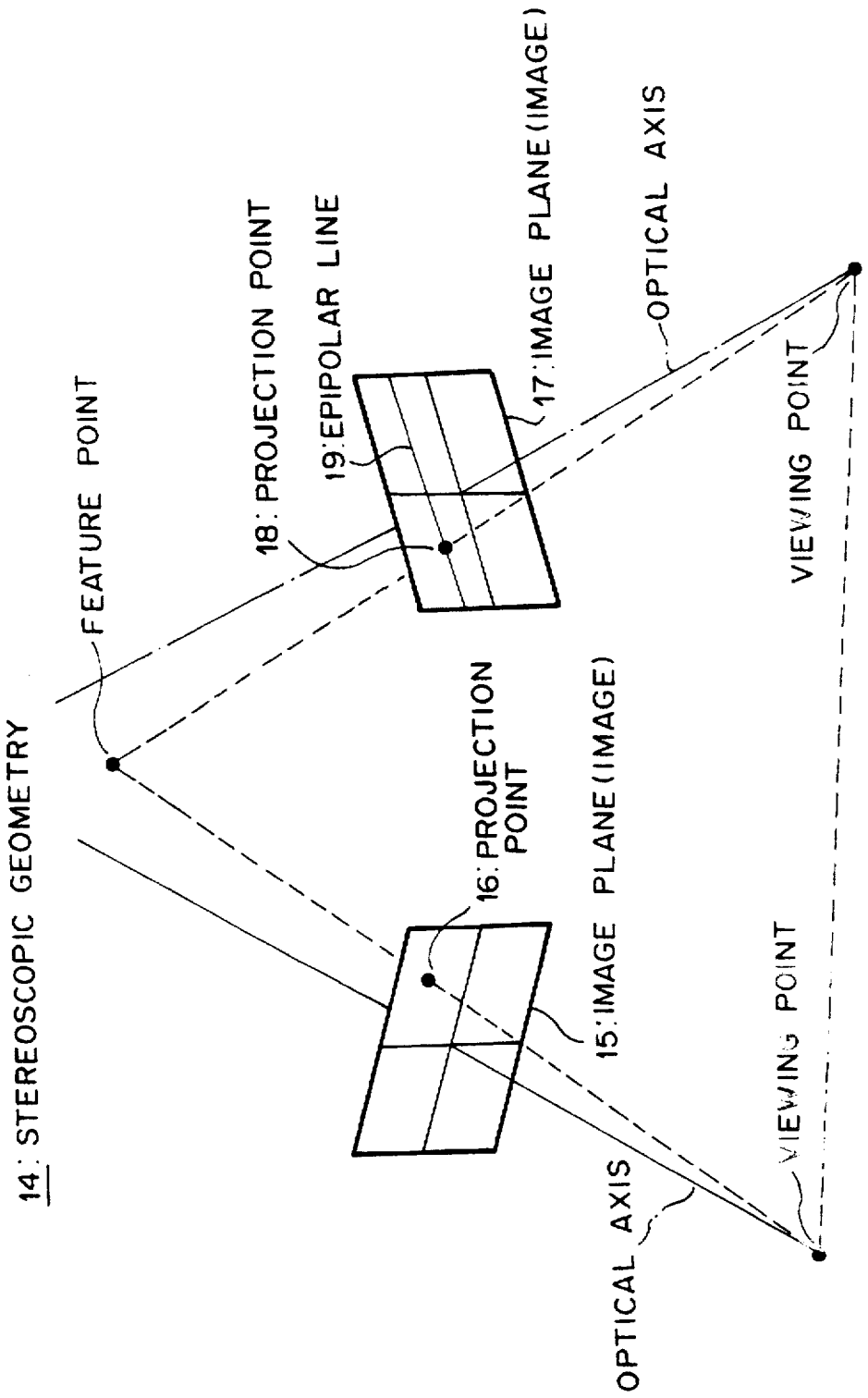
FIG. 11 is a diagram showing the corresponding relationship between projection points in stereo geometry used to explain the operation of a corresponding point searching unit of FIG. 10.

In a stereoscopic geometric arrangement 14 as shown in FIG. 11, a projection point 18 in an image plane (image) 17 which corresponds to a projection point 16 in an image plane (image 15) is geometrically restrained by a line which is called as an epipolar line 19. The epipolar line 19 can be represented by the camera parameters based on the angulation principle.

Based on the foregoing principle, the corresponding point searching unit 13 detects the corresponding point 16 in the image plane (image) 15 by the calculation of the epipolar line 19 and search the corresponding point along the epipolar line 19 using a pattern matching technique. The corresponding processing between the images of camera non-calibration feature points is performed on the basis of this idea.

By the corresponding processing, the corresponding point searching unit 13 calculates the two-dimensional coordinates of the calibration feature points in each image and sends them to outside.

Further, the image display device, the control unit 25 and the memory media 26 are performed as the same as the first embodiment of the present invention.

(3) THIRD EMBODIMENT OF THE PRESENT INVENTION

Figure 12:
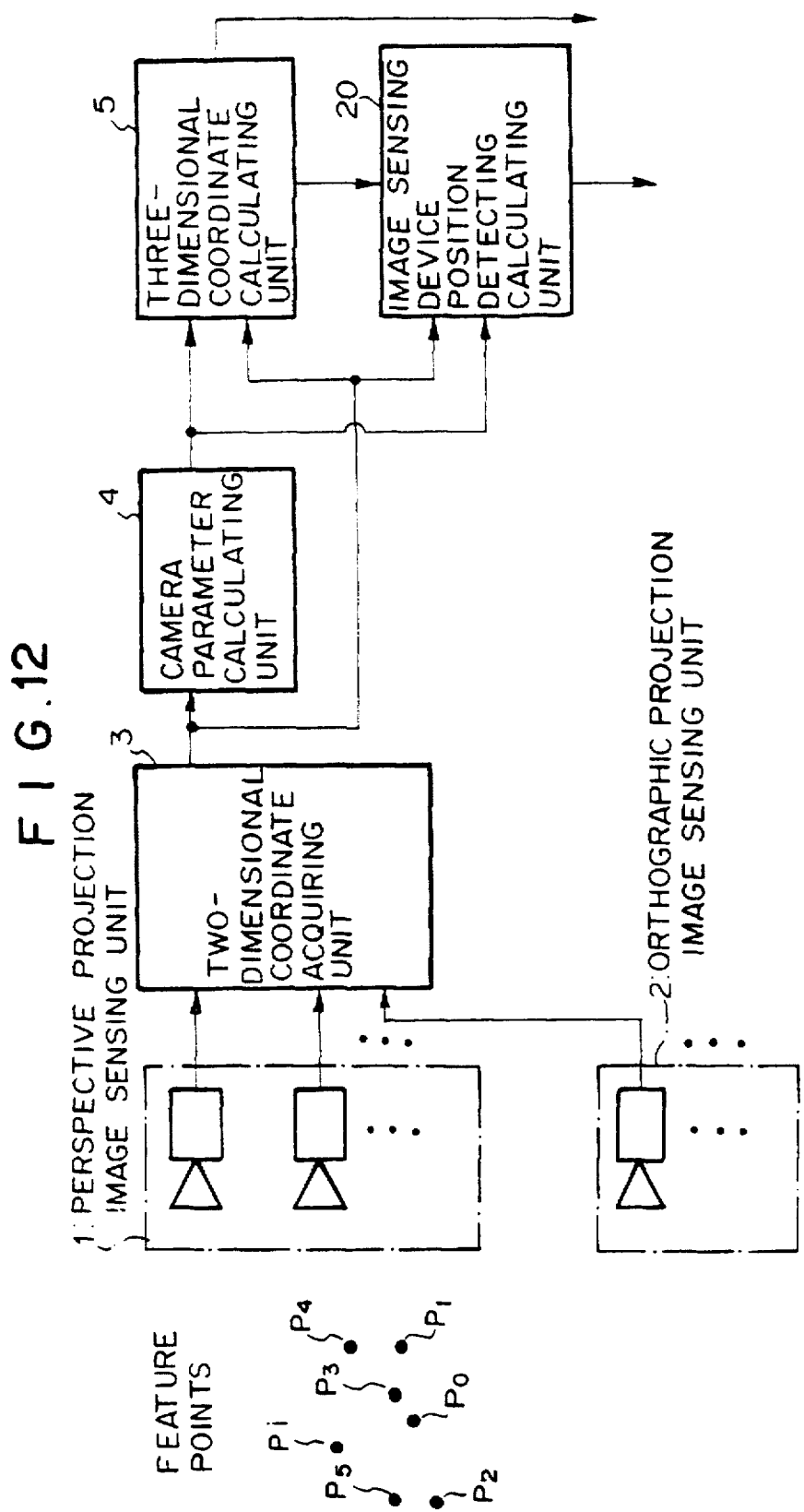
FIG. 12 is a block diagram showing the construction of a third embodiment of the three-dimensional position detecting apparatus of the present invention.

FIG. 12 is a block diagram showing the construction of a third embodiment of the three-dimensional position detecting apparatus of the present invention.

The three-dimensional position detecting apparatus of this embodiment includes a perspective projection image sensing unit 1, an orthographic projection image sensing unit 2, a two-dimensional coordinate acquiring unit 3, a camera parameter calculating unit 4, a three-dimensional coordinate calculating unit 5, and an image sensing device position calculating unit 20. That is, the three-dimensional position detecting apparatus of this embodiment (third embodiment) is achieved by adding the image sensing device position calculating unit 20 to the three-dimensional position detecting apparatus (see FIG. 1).

First, the operation of the three-dimensional position detecting apparatus of this embodiment will be described.

The perspective projection image sensing unit 1 takes a perspective projection image of a target object having plural feature points Pi (i=0,1, . . . ). The perspective projection image which is taken by the perspective projection image sensing unit 1 is sent to the two-dimensional coordinate acquiring unit 3.

The orthographic projection image sensing unit 2 takes an orthographic projection image of the target object having the plural feature points Pi (i=0, 1, . . . ). The orthographic projection image which is taken by the orthographic projection image sensing unit 2 is sent to the two-dimensional coordinate acquiring unit 3.

The two-dimensional coordinate acquiring unit 3 receives each image of the target object (each perspective projection image and each orthographic projection image) from the perspective projection image sensing unit 1 and the orthographic projection image sensing unit 2 to acquire the two-dimensional coordinate of each feature point in each image, and then sends the two-dimensional coordinates to the camera parameter calculating unit 4 and the three-dimensional coordinate calculating unit 5. Further, the two-dimensional coordinates of the reference points are also sent to the image sensing device position calculating unit 20.

The camera parameter calculating unit 4 receives the two-dimensional coordinates to calculate the camera parameters with the two-dimensional coordinates of some feature points, and then sends the camera parameters to the three-dimensional coordinate calculating unit 5 and the image sensing device position calculating unit 20.

The three-dimensional coordinate calculating unit 5 receives the two-dimensional coordinates of the feature points Pi (i=0,1, . . . ) in each image and the camera parameters, calculates the relative three-dimensional position between the plural feature points with these received values, and sends the three-dimensional position to the image sensing device position detecting calculating unit 20 and the outside.

The image sensing device position calculating unit 20 receives the two-dimensional coordinates of the reference points from the two-dimensional coordinate acquiring unit 3, and the camera parameters from the camera parameter calculating unit 4, and receives the three-dimensional coordinates of the feature points Pi (i=0,1, . . . ) in the normalized orthographic system Σ from the three-dimensional coordinate calculating unit 5.

With the above two-dimensional coordinates, the camera parameters and the three-dimensional coordinates, the image sensing device position calculating unit 20 calculates the relative three-dimensional position of the image sensing device CTj (j=1, . . . ) system of the perspective projection image sensing unit 1.

Next, the construction and the detailed operation of the image sensing device position calculating unit 20 which is a characteristic of the present invention and shown in FIG. 12 will be described.

Figure 13:
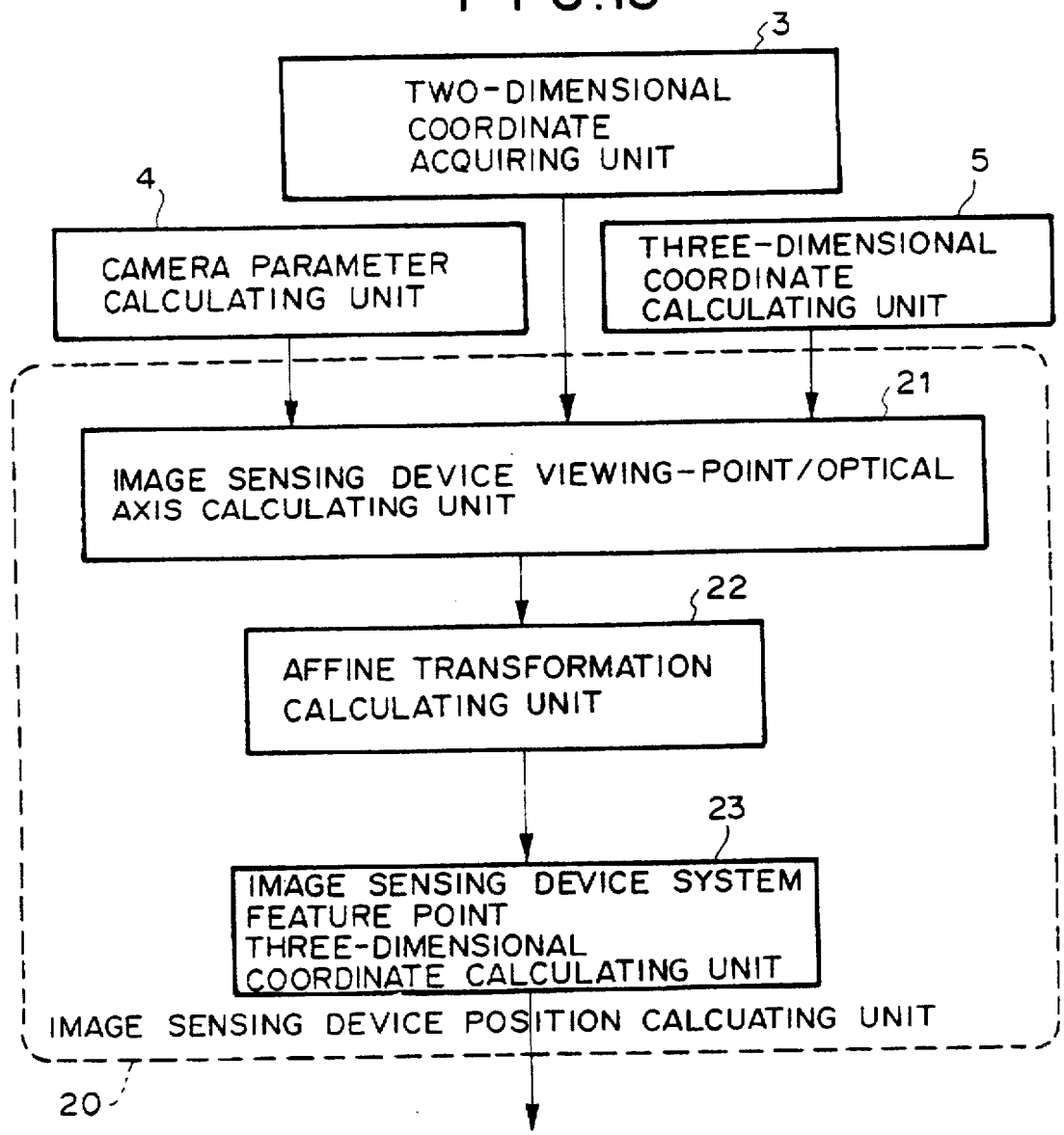
FIG. 13 is a block diagram showing the construction of an image sensing position calculating unit of FIG. 12.

As shown in FIG. 13, the image sensing device position calculating unit 20 comprises an image sensing device viewing point/optical axis calculating unit 21 for calculating the viewing point and the optical axis of the image sensing device CTj (j=1, . . . ) of the perspective projection image sensing unit 1 in the measurement system, an affine transformation calculating unit 22 for calculating a rotation matrix of an affine transformation from the measurement system to the image sensing device CTj system, and an image sensing device system feature point three-dimensional coordinate calculating unit 23 for calculating the three-dimensional coordinates of the feature points Pi (i=0, . . . ) in the image sensing device CTj system.

The image sensing device position calculating unit 20 thus constructed calculates the relative three-dimensional position of the image sensing device CTj (j=1, . . . ) system in the following operations (1) to (3).

(1) The image sensing device viewing point/optical axis calculating unit 21 operates as follows.

In the measurement system, the viewing point $O^j$ ($\alpha^j$, $\beta^j$, $\gamma^j$) of the image sensing device CTj of the perspective projection image sensing unit 1 can be calculated by solving the following equations (13), (14) and (15) because the line (straight line 12 in FIG. 3) which is an backprojection line of any point in the image plane passes through the viewing point $O^j$ at any time.

$$(c^j_1-1)\alpha^j+(c^j_2-1)\beta^j+(c^j_3-1)\gamma^j+1=0 \tag{13}$$

$$(c^j_1v^j_1-v^j_0)\alpha^j+(c^j_2v^j_2-v^j_0)\beta^j+(c^j_3v^j_3-v^j_0)\gamma^j+v^j_0=0 \tag{14}$$

$$(c^j_1u^j_1-u^j_0)\alpha^j+(c^j_2u^j_2-u^j_0)\beta^j+(c^j_3u^j_3-u^j_0)\gamma^j+u^j_0=0 \tag{15}$$

In the measurement system, the optical axis of the image sensing device CTj passes through the center point of the image plane, and thus it can be represented by the above equations (14) and (15).

The image sensing device viewing point/optical axis calculating unit 12 transforms the viewing point and the optical axis by using the transform matrix T (the transform matrix from the measurement system to the normalized orthographic system) to obtain the three-dimensional coordinate expression of the viewing point and the optical axis of the image sensing device CTj in the normalized orthographic system Σ.

(2) The affine transformation calculating unit 22 operates as follows.

As shown in FIG. 3, in the normalized orthographic system Λ, "the normal vector on a plane containing the $V^j$ axis and the viewing point $O^j$ of the image sensing device CTj of the perspective projection image sensing unit 1" is parallel to "the $x^j$ axis of the image sensing device CTj system", and "the normal vector of a plane containing the $u^j$ axis and the viewing point $O^j$ of the image sensing device CTj of the perspective projection image sensing unit 1" is parallel to "the $y^j$ axis of the image sensing device CTj system". Further, the direction vector of the optical axis of the image sensing device CTj in the normalized orthographic system Σ is parallel to the $z^j$ axis of the image sensing device CTj system.

By using the above relationship, the affine transformation calculating unit 22 derives the rotation matrix of the affine transformation from the normalized orthographic system Σ to the image sensing device CTj system. The parallel shift of the affine transformation coincides with the coordinate of the viewing point $O^j$ of the image sensing device CTj in the normalized orthographic system Σ.

(3) The image sensing device system feature point three-dimensional coordinate calculating unit 23 operates as follows.

The image sensing device system feature point three-dimensional coordinate calculating unit 23 calculates the three-dimensional coordinates of the feature points Pi in the image sensing device CTj system by the affine transformation with the viewing point $O^j$ of the image sensing device CTj in the normalized orthographic system Σ, the rotation matrix of the affine transformation from the normalized orthographic system Σ to the image sensing device CTj system and the coordinates of the feature points Pi (i=0, . . . ) in the normalized orthographic system Σ. The scale unit is the length of the line segment $P_0P_1$.

As described above, the image sensing device position calculating unit 20 (specifically, the image sensing device system feature point three-dimensional coordinate calculating unit 23) sends the viewing point $O^j$ the optical axis of the image sensing device CTj in the normalized orthographic system Σ, and the three-dimensional coordinates of the feature points $P_i$ in the image sensing device CTj system to the outside.

The three-dimensional position calculating device of the second embodiment may be further provided with the image sensing device positioning calculating unit (i.e., the three-dimensional position detecting apparatus may be designed to contain both the corresponding point searching unit 13 and the image sensing device position calculating unit 20).

(4) FOURTH EMBODIMENT OF THE INVENTION

The construction of the fourth embodiment of the three-dimensional position detecting apparatus according to the present invention can be illustrated in the block diagram of FIG. 1 like the first embodiment.

The three-dimensional position detecting apparatus of this embodiment comprises a perspective projection image sensing unit 1, an orthographic image sensing unit 2, a two-dimensional coordinate acquiring unit 3, a camera parameter calculating unit 4, and a three-dimensional coordinate calculating unit 5.

The three-dimensional position detecting apparatus of this embodiment is achieved in the case where it is known that the six points (feature points $P_1, \ldots, P_5$) of the feature points $P_i$ (i=0, ...) in FIG. 1 are the apexes of two rectangles which intersect to each other in a space as shown in FIG. 14.

In the three-dimensional position detecting apparatus of this embodiment, the two-dimensional coordinate acquiring unit 3 sets the reference points $P_k$ (k=0,1,2 and 3) as shown in FIG. 14 to perform the processing (which is described in the embodiments as described above) in consideration of the fact that "the six points (feature points $P_1, \ldots, P_5$) of the feature points $P_i$ (i=0, ...) are the apexes of two rectangles which intersect to each other in the space as shown in FIG. 14. That is, the two-dimensional coordinate acquiring unit 3 sets as reference points $P_0$ and $P_1$ the feature points at both ends of a line segment to which the two rectangles intersect, and also sets as reference points $P_2$ and $P_3$ feature points which are adjacent to the reference point $P_0$ in the two rectangles and other than the reference point $P_1$.

Further, in the three-dimensional position detecting apparatus of this embodiment, the camera parameter calculating unit 4 uses only the two-dimensional coordinates of the above six feature points $P_i$ (i=0, ..., 5) as "the two-dimensional coordinates of the feature points in each image (each perspective projection image and each orthographic projection image)" used for the calculation of the camera parameters.

As described above, the following is the reason why only the six feature points $P_i$ (i=0, ..., 5) are sufficient as the feature points which are targeted to calculate the camera parameters.

Note that, the two-dimensional coordinates of the reference points $P_k$ (k=0, 1, 2 and 3) in the image IS0 are represented by $(u^0_k, v^0_k)$, the two-dimensional coordinates of the reference points $P_k$ (k=0,1,2 and 3) are represented by $(u^j_k, v^j_k)$, and the projections of the line $l_1$ of FIG. 14 on the image IS0 and ITj (j=1, ...) are represented by the following equations (16) and (17).

$$m^0{}_2(u^0 - u^0{}_2) + n^0{}_2(v^0 - v^0{}_2) = 0 \quad (16)$$

$$m^j{}_2(u^j - u^j{}_2) + n^j{}_2(v^j - v^j{}_2) = 0 \quad (17)$$

At this time, the camera parameter calculating unit 4 can calculate the camera parameters $c^j_1$, $c^j_2$ and $c^j_3$ by the following equations (18), (19) and (20) without solving the equation (7) unlike the first embodiment.

$$c_1{}^j = \frac{\{m_3{}^0(u_1{}^0 - u_3{}^0) + n_3{}^0(v_1{}^0 - v_3{}^0)\}}{\{m_3{}^0(u_3{}^0 - u_0{}^0) + n_3{}^0(v_3{}^0 - v_0{}^0)\}} \cdot \frac{\{m_3{}^j(u_3{}^j - u_0{}^j) + n_3{}^j(v_3{}^j - v_0{}^j)\}}{\{m_3{}^j(u_1{}^j - u_3{}^j) + n_3{}^j(v_1{}^j - v_3{}^j)\}} \quad (18)$$

$$c_2{}^j = \frac{\{m_1{}^0(u_2{}^0 - u_3{}^0) + n_3{}^0(v_2{}^0 - v_3{}^0)\}}{\{m_1{}^0(u_3{}^0 - u_0{}^0) + n_3{}^0(v_3{}^0 - v_0{}^0)\}} \cdot \frac{\{m_1{}^j(u_3{}^j - u_0{}^j) + n_1{}^j(v_3{}^j - v_0{}^j)\}}{\{m_1{}^j(u_2{}^j - u_3{}^j) + n_1{}^j(v_2{}^j - v_3{}^j)\}} \quad (19)$$

$$c_3{}^j = \frac{\{m_2{}^0(u_3{}^0 - u_2{}^0) + n_2{}^0(v_3{}^0 - v_2{}^0)\}}{\{m_2{}^0(u_2{}^0 - u_0{}^0) + n_3{}^0(v_2{}^0 - v_0{}^0)\}} \cdot \frac{\{m_2{}^j(u_2{}^j - u_0{}^j) + n_2{}^j(v_2{}^j - v_0{}^j)\}}{\{m_2{}^j(u_3{}^j - u_2{}^j) + n_2{}^j(v_3{}^j - v_2{}^j)\}} \quad (20)$$

Therefore, only the six feature points $P_i$ (i=0, ..., 5) are sufficient as the feature points for the calculation of the camera parameters.

The three-dimensional position detecting apparatus may be designed to have the same construction as the second and third embodiments, and further the technical idea of this embodiment (fourth embodiment) may be introduced into the three-dimensional position detecting apparatus thus constructed.

Figure 15:
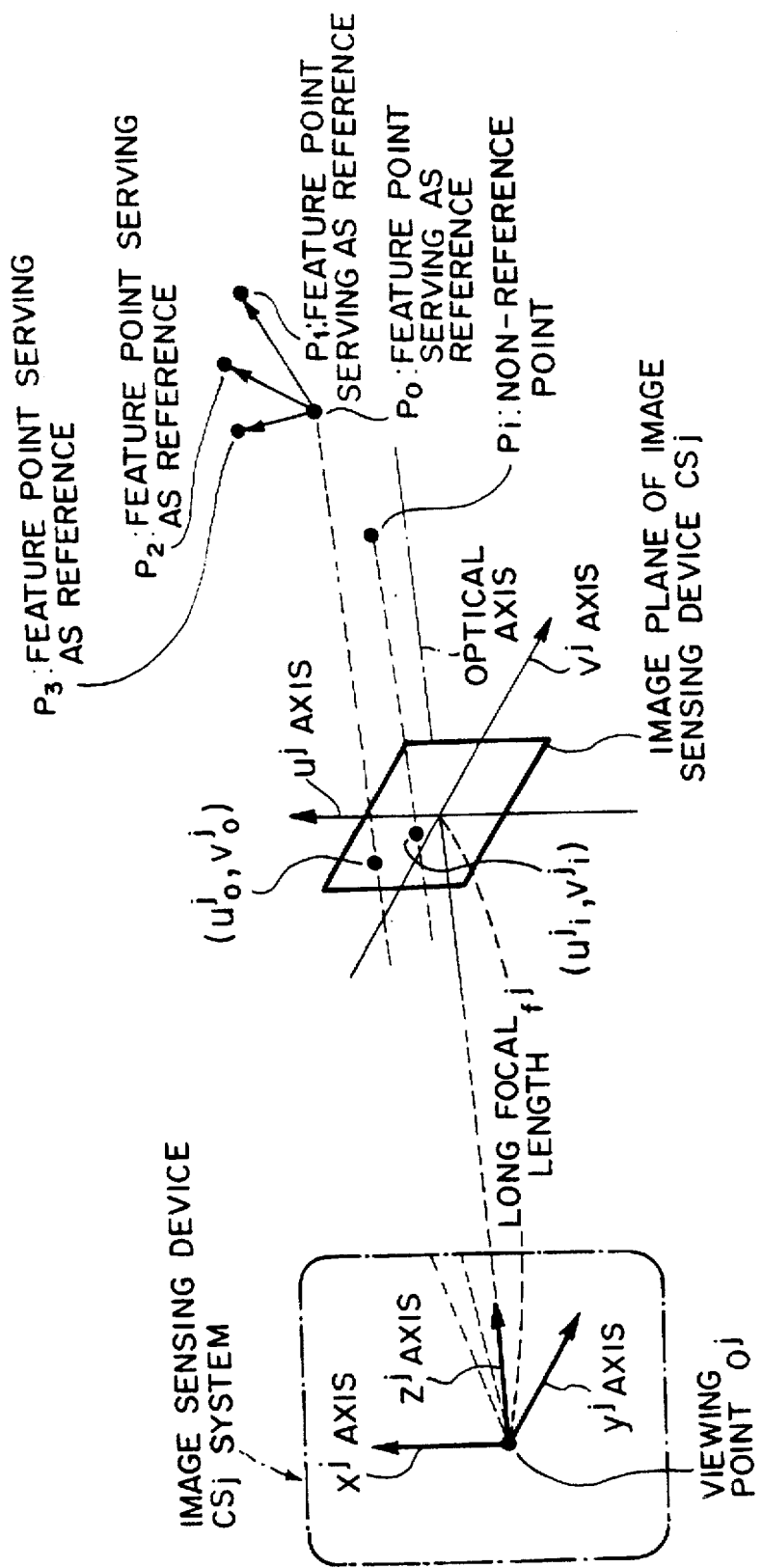
FIG. 15 is a diagram showing a fifth embodiment of the three-dimensional position detecting apparatus of the present invention.

(5) MODIFICATIONS OF THE ABOVE EMBODIMENTS (a) As shown in FIG. 15, an "image sensing device having a sufficient long focal length" may be applied to the image sensing device CSj (j=0, ...) of the orthographic projection image sensing device 2 of FIGS. 1, 10 and 12.

Figure 16:
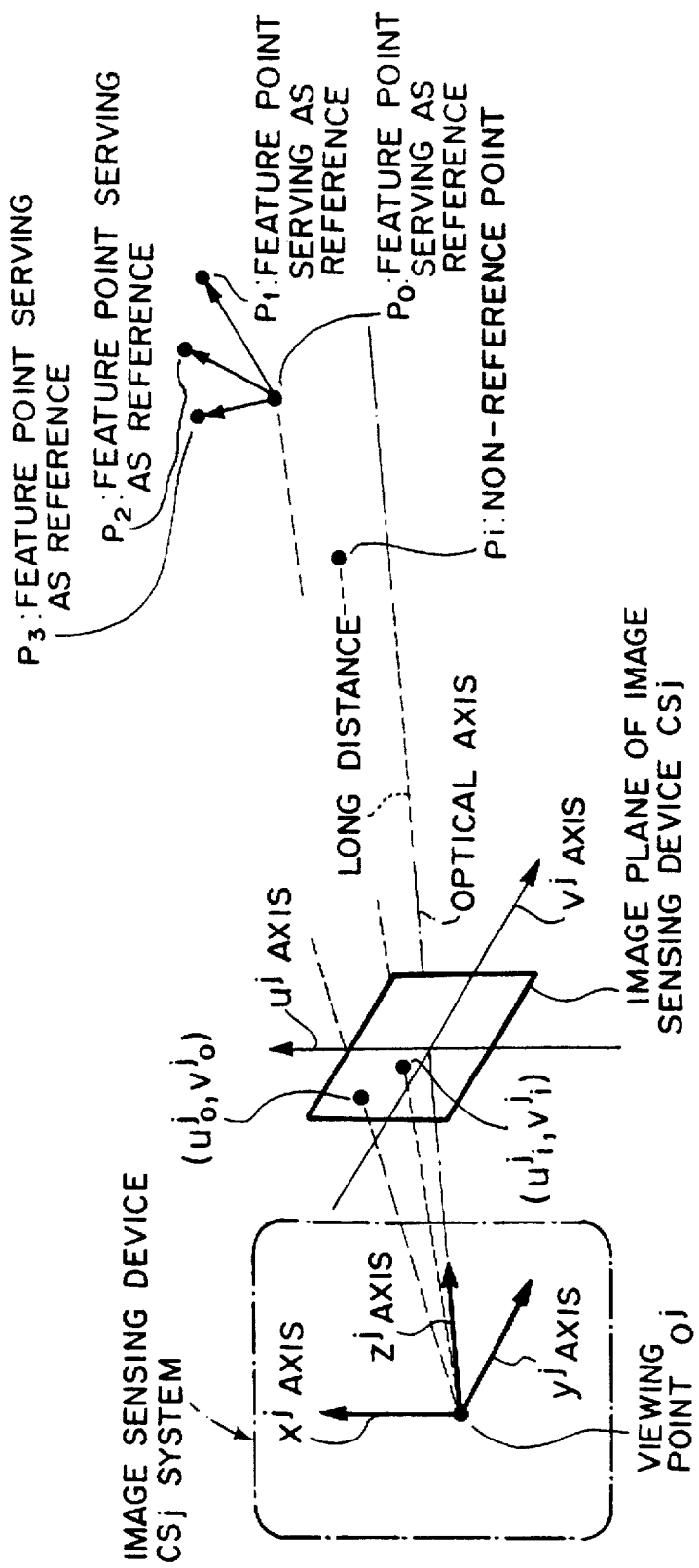
FIG. 16 is a diagram showing a sixth embodiment of the three-dimensional position detecting apparatus of the present invention.

(b) As shown in FIG. 16, an "image sensing device which is disposed away from each feature point (the target object having feature points) at a sufficiently longer distance as compared with the distance between the feature points" as shown in FIG. 16 may be used as an image sensing device of the orthographic projection image sensing unit 2 of FIGS. 1, 10 and 12.

As described above, according to the present invention, the following effects can be obtained.

According to the first aspect of the present invention, even when the optical characteristics of a camera, camera position information and three-dimensional position information of a measurement target space cannot be obtained, the relative three-dimensional position of measurement points (feature points of the target object) can be calculated from only image data.

According to the second aspect of the present invention, even when the optical characteristics of a camera, camera position information and three-dimensional position information of a measurement target space cannot be obtained, the relative three-dimensional position of measurement points (feature points of the target object) can be obtained from only image data at higher speed than the first aspect.

According to the third aspect of the present invention, even when the optical characteristics of a camera, camera position information and three-dimensional position information of a measurement target space cannot be obtained, the relative three-dimensional position of each image sensing device of the perspective projection image sensing unit can be obtained from only image data.

According to the fourth aspect of the present invention, when a target object to be imaged contains two rectangles which intersect to each other in a space and is frequently seen in a measurement target space where an image of an artificial object is taken, the measurement points and the relative three-dimensional position of each image sensing device of the perspective projection image sensing unit can be obtained at higher speed than the first to third aspects of the present invention.

Although the present invention has been shown and described with respect to best mode embodiments thereof, it should be understood by those skilled in the art that addition in the form and detail thereof may be made therein without departing from the spirit and scope of the present invention.

What is claimed is:

1. A three-dimensional position detecting apparatus comprises:

a perspective projection image sensing unit which has two or more image sensing devices and is adapted to take a perspective projection image of a target object having plural feature points by each image sensing device;

an orthographic projection image sensing unit which has one or more image sensing devices and is adapted to take an orthographic projection image of the target object having the plural feature points by each image sensing device;

a two-dimensional coordinate acquiring unit for acquiring the two-dimensional coordinates of the feature points in the perspective projection image which is taken by said perspective projection image sensing unit, and acquiring the two-dimensional coordinates of the feature points in the orthographic projection image which is taken by said orthographic projection image sensing unit;

a camera parameter calculating unit for calculating camera parameters by using the two-dimensional coordinates of the feature points which are obtained by said two-dimensional coordinate acquiring unit; and a three-dimensional coordinate calculating unit for calculating the relative three-dimensional position between the plural feature points by using the two-dimensional coordinates of the feature points and the camera parameters calculated by said camera parameter calculating unit.

2. The three-dimensional position detecting apparatus as claimed in claim 1, wherein a image sensing device position calculating unit calculates relative three-dimensional positions of an image sensing device of said perspective projection image sensing unit by using the two-dimensional coordinates of the reference points obtained by said two-dimensional coordinate acquiring unit, the camera parameters calculated by said camera parameter calculating unit and the relative three-dimensional position between the feature points which is detected by said three-dimensional coordinate calculating unit.

3. The three-dimensional position detecting apparatus as claimed in claims 1, wherein when six feature points of the feature points are known to correspond to the apexes of two rectangles which intersect to each other in a space, said two-dimensional coordinate acquiring unit sets as reference points $P_0$ and $P_1$ the feature points at both ends of a line segment to which the two rectangles intersect in the space, and sets as reference points $P_2$ and $P_3$ feature points which are adjacent to the reference point $P_0$ in the two rectangles and other than the reference point $P_1$, and said camera parameter calculating unit calculates the camera parameters by using the two-dimensional coordinates of the six feature points which correspond to the apexes of the two rectangles intersecting to each other in the space.

4. The three-dimensional position detecting apparatus as claimed in claims 1, wherein said orthographic projection image sensing unit takes the orthographic projection image by using an image sensing device having a sufficiently long focal length.

5. The three-dimensional position detecting apparatus as claimed in claims 1, wherein said orthographic projection image sensing unit takes the orthographic projection image by using an image sensing device which is disposed so that "the distance between said image sensing device and the target object" is sufficiently larger than "the distance between the feature points in the target object".

6. A three-dimensional position detecting apparatus comprises:

a perspective projection image sensing unit which has two or more image sensing devices and is adapted to take a perspective projection image of a target object having plural feature points by each image sensing device;

an orthographic projection image sensing unit which has one or more image sensing devices and is adapted to take an orthographic projection image of the target object having the plural feature points by each image sensing device;

a two-dimensional coordinate acquiring unit for acquiring the two-dimensional coordinates of feature points targeted to calculate camera parameters and in said perspective projection images which is taken by said perspective projection image sensing unit, and acquiring the two-dimensional coordinates of the feature points targeted to calculate the camera parameters in the orthographic projection image which is taken by said orthographic projection image sensing unit;

a camera parameter calculating unit for calculating the camera parameters by using the two-dimensional coordinates of the feature points which are targeted to calculate the camera parameters and obtained by said two-dimensional coordinate acquiring unit;

corresponding point searching unit for establishing the corresponding relationship of feature points which are not used for camera parameter calculation between the perspective projection image obtained by said perspective projection image sensing unit and the orthographic projection image obtained by said orthographic projection image sensing unit with the two-dimensional coordinates of the feature points which are used for camera parameter calculation obtained by said two-dimensional coordinate acquiring unit and the camera parameters calculated by the camera parameter calculating unit, and detecting the two-dimensional coordinates of the feature points which are not used for camera parameter calculation in the perspective projection image obtained by said perspective projection image sensing unit and the two-dimensional coordinates of the feature points which are not used for camera parameter calculation in the orthographic projection image obtained by said orthographic projection image sensing unit; and a three-dimensional coordinate calculating unit for calculating the relative three-dimensional position between the plural feature points by using the two-dimensional coordinates obtained by said two-dimensional coordinate acquiring unit, of the feature points which are used for the camera parameter calculation, the camera parameters calculated by said camera parameter calculating unit, and the two-dimensional coordinates obtained by said corresponding point searching unit, of the feature points which are not used for camera parameter calculation.

7. The three-dimensional position detecting apparatus as claimed in claim 6, wherein a image sensing device position calculating unit calculates relative three-dimensional positions of image sensing devices of said perspective projection image sensing unit by using the two-dimensional coordinates of the reference points obtained by said two-dimensional coordinate acquiring unit, the camera parameters calculated by said camera parameter calculating unit and the relative three-dimensional position between the feature points which is detected by said three-dimensional coordinate calculating unit.

8. The three-dimensional position detecting apparatus as claimed in claim 6, wherein when six feature points of the feature points are known to correspond to the apexes of two rectangles which intersect to each other in a space, said two-dimensional coordinate acquiring unit sets as reference points $P_0$ and $P_1$ the feature points at both ends of a line segment to which the two rectangles intersect in the space, and sets as reference points $P_2$ and $P_3$ feature points which are adjacent to the reference point $P_0$ in the two rectangles and other than the reference point $P_1$, and said camera parameter calculating unit calculates the camera parameters by using the two-dimensional coordinates of the six feature points which correspond to the apexes of the two rectangles intersecting to each other in the space.

9. The three-dimensional position detecting apparatus as claimed in claim 6, wherein said orthographic projection image sensing unit takes the orthographic projection image by using an image sensing device having a sufficiently long focal length.

10. The three-dimensional position detecting apparatus as claimed in claim 6, wherein said orthographic projection image sensing unit takes the orthographic projection image by using an image sensing device which is disposed so that "the distance between said image sensing device and the target object" is sufficiently larger than "the distance between the feature points in the target object".

11. The three-dimensional position detecting apparatus as claimed in claim 7, wherein when six feature points of the feature points are known to correspond to the apexes of two rectangles which intersect to each other in a space, said two-dimensional coordinate acquiring unit sets as reference points $P_0$ and $P_1$ the feature points at both ends of a line segment to which the two rectangles intersect in the space, and sets as reference points $P_2$ and $P_3$ feature points which are adjacent to the reference point $P_0$ in the two rectangles and other than the reference point $P_1$, and said camera parameter calculating unit calculates the camera parameters by using the two-dimensional coordinates of the six feature points which correspond to the apexes of the two rectangles intersecting to each other in the space.

12. The three-dimensional position detecting apparatus as claimed in claim 7, wherein said orthographic projection image sensing unit takes the orthographic projection image by using an image sensing device having a sufficiently long focal length.

13. The three-dimensional position detecting apparatus as claimed in claim 7, wherein said orthographic projection image sensing unit takes the orthographic projection image by using an image sensing device which is disposed so that "the distance between said image sensing device and the target object" is sufficiently larger than "the distance between the feature points in the target object".

14. The three-dimensional position detecting apparatus as claimed in claim 8, wherein said orthographic projection image sensing unit takes the orthographic projection image by using an image sensing device having a sufficiently long focal length.

15. The three-dimensional position detecting apparatus as claimed in claim 8, wherein said orthographic projection image sensing unit takes the orthographic projection image by using an image sensing device which is disposed so that "the distance between said image sensing device and the target object" is sufficiently larger than "the distance between the feature points in the target object".

16. A memory media for storing a program software of detecting three-dimensional positions, the program software comprises following steps:

taking a perspective projection image of a target object having plural feature points by each image sensing device by using a perspective projection image sensing unit which has two or more image sensing devices;

picking up an orthographic projection image of the target object having the plural feature points by each image sensing device by using an orthographic projection image sensing unit which has one or more image sensing devices;

acquiring two-dimensional coordinates of the feature points in the perspective projection image which is taken by said perspective projection image sensing unit, and two-dimensional coordinates of the feature points in the orthographic projection image which is taken by said orthographic projection image sensing unit;

calculating camera parameters by using the two-dimensional coordinates of the feature points obtained by said two-dimensional coordinate acquiring unit; and for calculating the relative three-dimensional position between the plural feature points by using the two-dimensional coordinates of the feature points and the camera parameters calculated by said camera parameter calculating step.

* * * * *

UNITED STATES PATENT AND TRADEMARK OFFICE
CERTIFICATE OF CORRECTION

PATENT NO. : 5,757,674
DATED : May 26, 1998
INVENTOR(S) : Atsushi MARUGAME

It is certified that error appears in the above-identified patent and that said Letters Patent is hereby corrected as shown below:

Please note that Column 2, line 27, contains a typographical error wherein "He-5-7981" should read --Hei-5-79819--.

Signed and Sealed this

Twenty-third Day of March, 1999

Attest:

Q. TODD DICKINSON

*Attesting Officer*  *Acting Commissioner of Patents and Trademarks*

UNITED STATES PATENT AND TRADEMARK OFFICE
CERTIFICATE OF CORRECTION

PATENT NO. : 5,757,674
DATED : May 26, 1998
INVENTOR(S) : Atsushi MARUGAME

It is certified that error appears in the above-identified patent and that said Letters Patent is hereby corrected as shown below:

Column 2, line 27: "He-5-7981" should read --He-5-79819--.

Signed and Sealed this

Sixth Day of July, 1999

Attest:

Q. TODD DICKINSON

Attesting Officer  Acting Commissioner of Patents and Trademarks